United States Patent [19]
Valdivia et al.

[11] Patent Number: 5,463,294
[45] Date of Patent: Oct. 31, 1995

[54] CONTROL MECHANISM FOR ELECTRIC VEHICLE

[75] Inventors: Aaron D. Valdivia, Baltimore; Eric L. Mohler, Anne Arundel, both of Md.

[73] Assignee: Westinghouse Electric Corp., Pittsburgh, Pa.

[21] Appl. No.: 258,149

[22] Filed: Jun. 10, 1994

[51] Int. Cl.⁶ .................................................. H02P 7/00
[52] U.S. Cl. .................... 318/432; 318/434; 318/471; 318/472
[58] Field of Search .................... 318/432, 255, 318/434, 471, 798, 472, 431; 180/170, 178

[56] References Cited

U.S. PATENT DOCUMENTS

| | | |
|---|---|---|
| 4,412,291 | 10/1983 | Amberg et al. |
| 5,227,703 | 7/1993 | Boothe et al. |
| 5,289,890 | 3/1994 | Toyoda et al. ............ 318/432 |
| 5,291,109 | 3/1994 | Peter ....................... 318/432 |
| 5,294,871 | 3/1994 | Imaseki .................... 318/432 |
| 5,362,222 | 11/1994 | Faig et al. |

Primary Examiner—William M. Shoop, Jr.
Assistant Examiner—Karen Masih
Attorney, Agent, or Firm—Walter G. Sutcliff

[57] ABSTRACT

A motor controller for a vehicle including an electric motor that drives the vehicle, a plurality of sensors and a vehicle power controller. The vehicle power controller receives signals from an accelerator sensor and a brake sensor, converts the signals for the accelerator sensor and the brake sensor into a torque value. The motor controller comprises three components. A first component receives the torque value from the vehicle power controller. A second component converts the torque value into a torque output; and a third component controls the motor in accordance with the torque output.

20 Claims, 28 Drawing Sheets

PARAMETER INITIALIZATION COMPONENT

CHASSIS CONTROLLER I/O

FAULT LOGGING COMPONENT

MODE PROCESSING STATE TRANSITION
NEUTRAL − START − NEUTRAL

MODE PROCESSING STATE TRANSITIONS
NEUTRAL - START - NEUTRAL

| EVENT CODE | DESCRIPTION | ACTION CODE | DESCRIPTION |
|---|---|---|---|
| E.N.S. | Start Command | A.N.S | Set Mode = START:0 |
| E.S.0.1 | Low battery voltage (Vbat < MinBatteryVoltage) | A.S.0.1 | Set Status = LOW_BATTERY or HIGH_BATTERY<br>Set Mode = NEUTRAL |
| E.S.0.2 | Ok to run capacitor precharge test (Vbat >= MinBatteryVoltage) AND (Vdc < MinTestVoltage) AND (Temperature > MinTestTemperature)) | A.S.0.2 | Close precharge relay<br>Set Timer = 0<br>Set Mode = START:1 |
| E.S.0.3 | Bus already precharged; bypass capacitor precharge test (Vbat >= MinBatteryVoltage) AND (Vdc >= MinTestVoltage) OR (Temperature < MinTestTemperature)) | A.S.0.3 | Close precharge relay<br>Set Timer = 0<br>Set Mode = START:2 |
| E.S.1.1 | Bus is not charging (Timer > CheckShortTime) AND (Vdc < MinTestVoltage) | A.S.1.1 | Close discharge relay<br>Set Status = PRECHARGE FAILED<br>Set Mode = NEUTRAL |
| E.S.1.2 | Timer < CapacitorChargeTime | A.S.1.2 | Increment Timer |
| E.S.1.3 | Timer >= CapacitorChargeTime | A.S.1.3 | if(Vdc > CapacitorChargeTestVoltage)<br>   Set CapacitorPrechargeTestStatus = PASSED<br>else<br>   Set CapacitorPrechargeTestStatus = FAILED<br>Set Timer = 0<br>Set Mode = START:2 |
| E.S.2.1 | Bus is not charging (Timer > MaxChargeTime) AND (Vdc < MinTestVoltage) | A.S.2.1 | Close discharge relay<br>Set Status = PRECHARGE_FAILED<br>Set Mode = NEUTRAL |
| E.S.2.2 | (Timer < MaxChargeTime AND (Vdc > MinTest Voltage) | A.S.2.2 | Increment Timer |
| E.S.2.3 | Bus Charged (Vbat - Vdc) < MinDelta | A.S.2.3 | Set PrechargeRelay Status = PASSED<br>Set Time = 0<br>Set Mode = START:3 |
| E.S.3.1 | Bus is discharging Timer < OnTimeConstant AND (Vdc < MinTestVoltage) | A.S.3.1 | Close discharge relay<br>Set Status = PRECHARGE_FAILED<br>Set Mode = NEUTRAL |
| E.S.3.2 | Timer < OneTimeConstant | A.S.3.2 | Increment Timer |
| E.S.3.3 | Timer >= OneTimeConstant | A.S.3.3 | Close Main Relay<br>Timer = 0<br>Set Mode = START:5 |

*FIG. 20A*

| | | | |
|---|---|---|---|
| E.S.4.1 | Timer < MainRelayBounceTime | A.S.4.1 | Increment Timer |
| E.S.4.2 | Timer >= MainRelayBounceTime | A.S.4.2 | Start main relay close test<br>Set Timer = 0<br>Set Mode = Start:5 |
| E.S.5.1 | Timer < MainRelayTestTime | A.S.5.1 | Increment Timer |
| E.S.5.2 | Timer >= MainRelayTestTime and test failed<br>((Vbat - Vdc) > MinDelta | A.S.5.2 | Set MainRelayStatus = FAILED<br>Set Mode = NEUTRAL |
| E.S.5.3 | Timer >=MainRelayTestTime and test passed<br>(Vbat - Vdc) <= MinDelta | A.S.5.3 | Cancel main relay test<br>Set MainRelayStatus = PASSED<br>Set Timer = 0<br>Set Mode = START:6 |
| E.S.6.1 | IGBT Short Test Failed (Bridge 1 or 2) OR<br>IGBT Open Tests Failed (Bridge 1 or 2) | A.S.6.1 | Set IGBT Status = FAILED<br>Set Mode = NEUTRAL |
| E.S.6.2 | IGBT Short Test Passed AND<br>IGBT Open Tests Failed (Bridge 1 or 2) | A.S.6.2 | Set IGBT Status = FAILED<br>Disable Failed Bridge<br>Send DSP Operating Parameters<br>Set Mode = NEUTRAL |
| E.S.6.3 | IGBT Short Tests Passed AND<br>IGBT Open Tests Passed | A.S.6.3 | Set IGBT Status = PASSED<br>Send DSP Operating Parameters<br>Set Mode = NEUTRAL |

*FIG.20B*

MODE PROCESSING STATE TRANSITIONS
NEUTRAL - DRIVE - NEUTRAL

| EVENT CODE | DESCRIPTION | ACTION CODE | DESCRIPTION |
|---|---|---|---|
| E.N.D | Drive Command (Forward or Reverse) | A.N.D | Set Mode = DRIVE:0 |
| E.D0.1 | Low Battery Voltage (Vbat < Vbatmin) | A.D0.1 | Set Status = LOW_BATTERY<br>Set Mode = NEUTRAL |
| E.D0.2 | Battery Voltage OK (Vbat >=Vbatmin) | A.D.0.2 | Close precharge relay<br>Set Timer = 0<br>Set Mode = DRIVE:1 |
| E.D.1.1 | Bus is not charging or losing charge<br><br>Timer > MaxChrgeTime)OR<br>(Timer > CheckShortTime AND Vdc < MinTestVolts) | A.D.1.1 | Close discharge relay<br>Set Status = PRECHARGE FAILED<br>Set Mode = NEUTRAL |
| E.D1.2 | Bus charged (Vbat - Vdc < MinDelta) | A.D1.2 | Set Status = PRECHARGE_RELAY_PASSED<br>Set Timer = 0<br>Set Mode =DRIVE:2 |
| E.D.2.1 | Bus is losing charge<br>(Vdc < MinTestVoltage) | A.D.2.1 | Close discharge relay<br>Set Status = PRECHARGE_FAILED<br>Set Mode = NEUTRAL |
| E.D.2.2 | Timer <= OneTimeConstant | A.D.2.2 | Increment Timer |
| E.D.2.3 | Timer > OneTimeConstant | A.D.2.3 | Close Main Relay<br>Set Timer = 0<br>Set Mode = DRIVE:3 |
| E.D.3.1 | Timer > MainRelayBounceTime | A.D.3.1 | Enable IGBTs<br>Set DSP Mode = DRIVE<br>Set Timer = 0<br>Set Mode = DRIVE:4 |
| E.D.3.2 | Timer <= MainRelayBounceTime | A.D.3.2 | Increment Timer |
| E.D.4.1 | Mode Command = NEUTRAL | A.S.4.1 | Go to Neutral |
| E.D.4.2 | Mode Command is not DRIVE or NEUTRAL | A.D.4.2 | Set Status = SEQUENCE_ERROR<br>GoToNeutral |
| E.D.4.3 | DSP Mode is not DRIVE | A.D.4.3 | Set Status = DSP_MODE_ERROR<br>GoToNeutral |
| E.D.4.4 | Mode Command = DRIVE (Forward or Reverse) | A.D.4.4 | Set Mode = DRIVE:4 (Forward or Reverse) |
| E.D.4.5 | Over Current | A.D.4.5 | Increment OverCurrentCounter<br>Set Status = OVER_CURRENT<br>Disable IGBTs<br>Set DSP Mode = NEUTRAL<br>Set Timer = MainRelayBounceTime<br>Set Mode = DRIVE:3 |

*FIG.22*

MODE PROCESSING STATE TRANSITIONS
NEUTRAL - BIT

| EVENT CODE | DESCRIPTION | ACTION CODE | DESCRIPTION |
|---|---|---|---|
| E.N.B | Bit Command | A.N.B | Set Mode = BIT:0 |
| E.B0.1 | Realtime Interrupt | A.B0.1 | Open main relay<br>Set Timer = 0<br>Set Mode = BIT:1 |
| E.B.1.1 | Timer <= MainRelayBounceTime | A.B.1.1 | Increment Timer |
| E.B1.2 | Timer > MainRelayBounceTime | A.B1.2 | Close discharge relay<br>Set Timer = 0<br>Set Mode = BIT:2 |
| E.B.2.1 | DC link voltage not discharged<br>(Vdc <= VoltageDecayTime) | AB.2.1 | Increment Timer |
| E.B2.2 | DC link voltage discharged<br>(Vdc > VoltageDecayTime) | A.B.2.1 | Set DSP Mode = BIT<br>Set Mode = BIT:3 |
| E.D.3.1 | Chassis Fault detected | A.B.3.1 | Open main relay<br>Close discharge relay<br>Set Status = ChassisFault |

*FIG.28*

BIT MODE PROCESSING COMPONENT

5,463,294

CONTROL MECHANISM FOR ELECTRIC VEHICLE

RELATED APPLICATIONS

The following identified U.S. patent applications are filed on the same date as the instant application and are relied upon and incorporated by reference in this application.

U.S. patent application entitled "Flat Topping Concept" bearing attorney docket No. 08/258,295, and filed on the same date herewith;

U.S. patent application entitled "Electric Induction Motor And Related Method Of Cooling" bearing attorney docket No. 08/258,332, and filed on the same date herewith;

U.S. patent application entitled "Automotive 12 Volt System For Electric Vehicles" bearing attorney docket No. 08/258,333, and filed on the same date herewith;

U.S. patent application entitled "Direct Cooled Switching Module For Electric Vehicle Propulsion System" bearing attorney docket No. 08/258,334, and filed on the same date herewith;

U.S. patent application entitled "Electric Vehicle Propulsion System" bearing attorney docket No. 08/258,335, and filed on the same date herewith;

U.S. patent application entitled "Vector Control Board For An Electric Vehicle Propulsion System Motor Controller" bearing attorney docket No. 08/258,337, and filed on the same date herewith;

U.S. patent application entitled "Digital Pulse Width Modulator With Integrated Test And Control" bearing attorney docket No. 08/258,338, and filed on the same date herewith;

U.S. patent application entitled "Improved EMI Filter Topology for Power Inverters" bearing attorney docket No. 08/258,340, and filed on the same date herewith;

U.S. patent application entitled "Fault Detection Circuit For Sensing Leakage Currents Between Power Source And Chassis" bearing attorney docket No. 08/258,341, and filed on the same date herewith;

U.S. patent application entitled "Electric Vehicle Relay Assembly" bearing attorney docket No. 08/258,342, and filed on the same date herewith;

U.S. patent application entitled "Three Phase Power Bridge Assembly" bearing attorney docket No. 08/258,343, and filed on the same date herewith;

U.S. patent application entitled "Electric Vehicle Propulsion System Power Bridge With Built-In Test" bearing attorney docket No. 08/258,344, and filed on the same date herewith;

U.S. patent application entitled "Method For Testing A Power Bridge For An Electric Vehicle Propulsion System" bearing attorney docket No. 08/258,345, and filed on the same date herewith;

U.S. patent application entitled "Electric Vehicle Power Distribution Module" bearing attorney docket No. 08/258,346, and filed on the same date herewith;

U.S. patent application entitled "Electric Vehicle Chassis Controller" bearing attorney docket No. 08/258,347, and filed on the same date herewith;

U.S. patent application entitled "Electric Vehicle System Control Unit Housing" bearing attorney docket No. 08/258,348, and filed on the same date herewith;

U.S. patent application entitled "Low Cost Fluid Cooled Housing For Electric Vehicle System Control Unit" bearing attorney docket No. 08/258,349, and filed on the same date herewith;

U.S. patent application entitled "Electric Vehicle Coolant Pump Assembly" bearing attorney docket No. 08/258,350, and filed on the same date herewith;

U.S. patent application entitled "Heat Dissipating Transformer Coil" bearing attorney docket No. 08/258,351, and filed on the same date herewith;

U.S. patent application entitled "Electric Vehicle Battery Charger" bearing attorney docket No. 08/258,352, and filed on the same date herewith.

BACKGROUND OF THE INVENTION

1. Field of the Invention

The present invention relates to a vector control board. More particularly, the present invention relates to a vector control board for an electric vehicle propulsion system motor controller. While the invention is subject to a wide range of applications, it is especially suited for use in electric vehicles that utilize batteries or a combination of batteries and other sources, e.g., a heat engine coupled to an alternator, as a source of power, and will be particularly described in that connection.

2. Description of the Related Art

For an electric vehicle to be commercially viable, its cost and performance should be competitive with that of its gasoline-powered counterparts. Typically, the vehicle's propulsion system and battery are the main factors which contribute to the vehicle's cost and performance competitiveness.

Generally, to achieve commercial acceptance, an electric vehicle propulsion system should provide the following features: (1) vehicle performance equivalent to typical gasoline-powered propulsion systems; (2) smooth control of vehicle propulsion; (3) regenerative braking; (4) high efficiency; (5) low cost; (6) self-cooling; (7) electromagnetic interference (EMI) containment; (8) fault detection and self-protection; (9) self-test and diagnostics capability; (10) control and status interfaces with external systems; (11) safe operation and maintenance; (12) flexible battery charging capability; and (13) auxiliary 12 volt power from the main battery. In prior practice, however, electric vehicle propulsion system design consisted largely of matching a motor and controller with a set of vehicle performance goals, such that performance was often sacrificed to permit a practical motor and controller design. Further, little attention was given to the foregoing features that enhance commercial acceptance.

For example, a typical conventional electric vehicle propulsion system consisted of a DC motor, a chopper-type motor controller, an independent battery charger, and a distributed set of controls and status indicators. Vehicle performance was generally inadequate for highway driving, acceleration was uneven, and manual gear-changes were required. In addition, regenerative braking was either not available or, at best, available only at high motor speeds. Also, each of the system components had its own cooling system that used forced air or a combination of forced air and liquid cooling. Moreover, the issues of volume production cost, EMI, fault detection, maintenance, control and status interfaces, and safety were generally not addressed in a comprehensive manner.

SUMMARY OF THE INVENTION

Accordingly, the present invention is directed to a vector control board for an electric vehicle propulsion system motor controller that substantially obviates one or more of the problems due to the limitations and disadvantages of the related art.

Features and advantages of the invention will be set forth in the description which follows, and in part will be apparent from the description, or may be learned by practice of the invention. The objectives and other advantages of the invention will be realized and attained by the method and apparatus particularly pointed out in the written description and claims thereof as well as the appended drawings.

To achieve these and other advantages and in accordance with the purpose of the invention, as embodied and broadly described, the invention provides for a motor controller for a vehicle including an electric motor that drives the vehicle, a plurality of sensors and a vehicle power controller. The vehicle power controller receives signals from an accelerator sensor and a brake sensor, converts the signals for the accelerator sensor and the brake sensor into a torque value. The motor controller comprises means for receiving the torque value from the vehicle power controller, means for converting the torque value into a torque output, and means for controlling the motor in accordance with the torque output.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate a presently preferred embodiment of the invention and, together with the description, serve to explain the principles of the invention. In the drawings:

FIG. 20 is a table listing the events and actions for the state diagram of FIG. 19.

FIG. 22 is a table listing the events and actions for the state diagram of FIG. 21.

FIG. 28 is a table listing the events and actions for the state diagram of FIG. 27.

DESCRIPTION OF THE PREFERRED EMBODIMENT

Reference will now be made in detail to a present preferred embodiment of the invention, an example of which is illustrated in the accompanying drawings.

Figure 1:
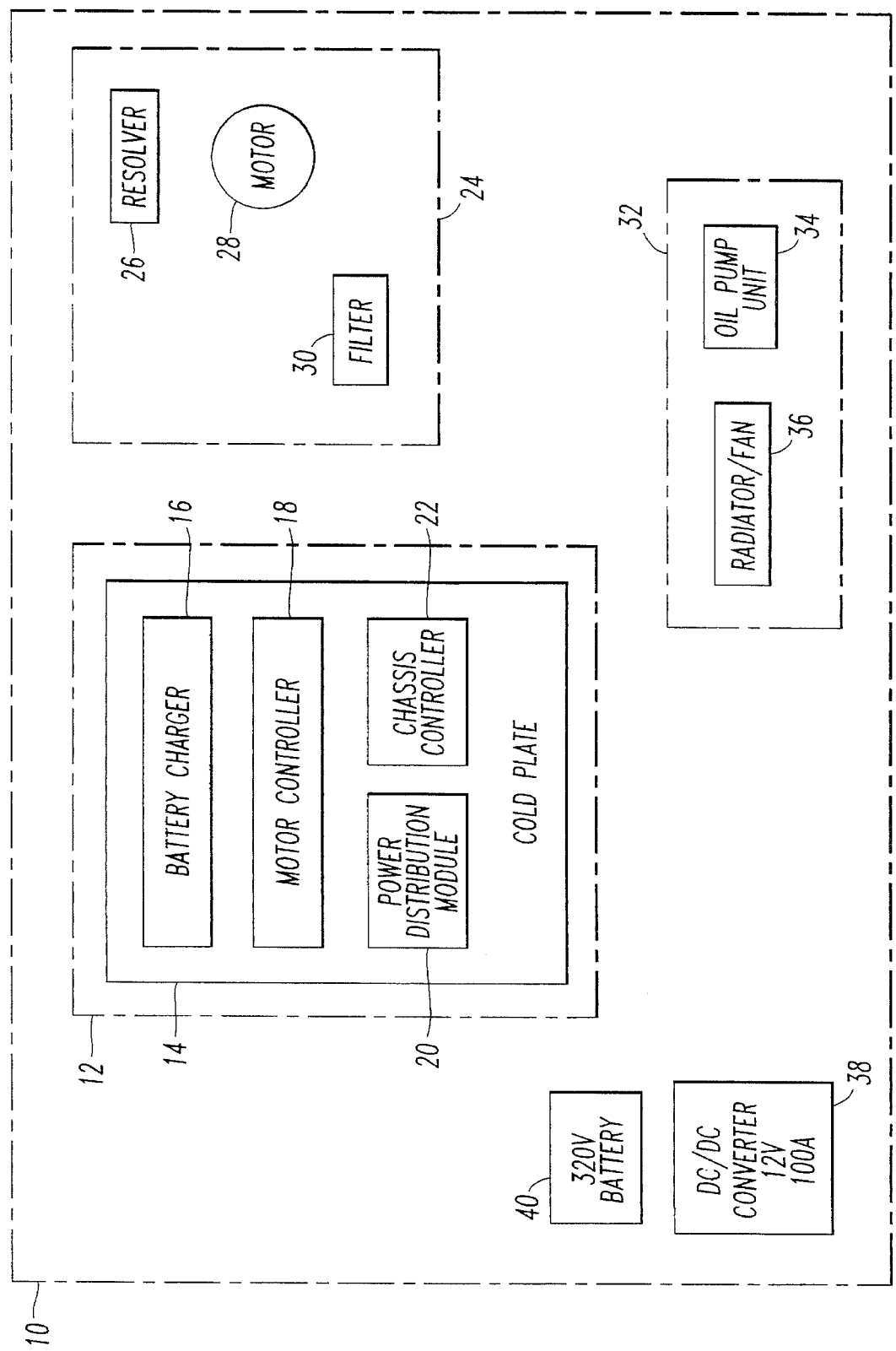
FIG. 1 is a block diagram of an electric vehicle propulsion system in accordance with a preferred embodiment of the invention.

As shown in FIG. 1, there is provided an electric vehicle propulsion system 10 comprising a system control unit 12, a motor assembly 24, a cooling system 32, a battery 40, and a DC/DC converter 38. The system control unit 12 includes a cold plate 14, a battery charger 16, a motor controller 18, a power distribution module 20, and a chassis controller 22. The motor assembly 24 includes a resolver 26, a motor 28, and a filter 30. The cooling system 32 includes an oil pump unit 34 and a radiator/fan 36.

Figure 2:
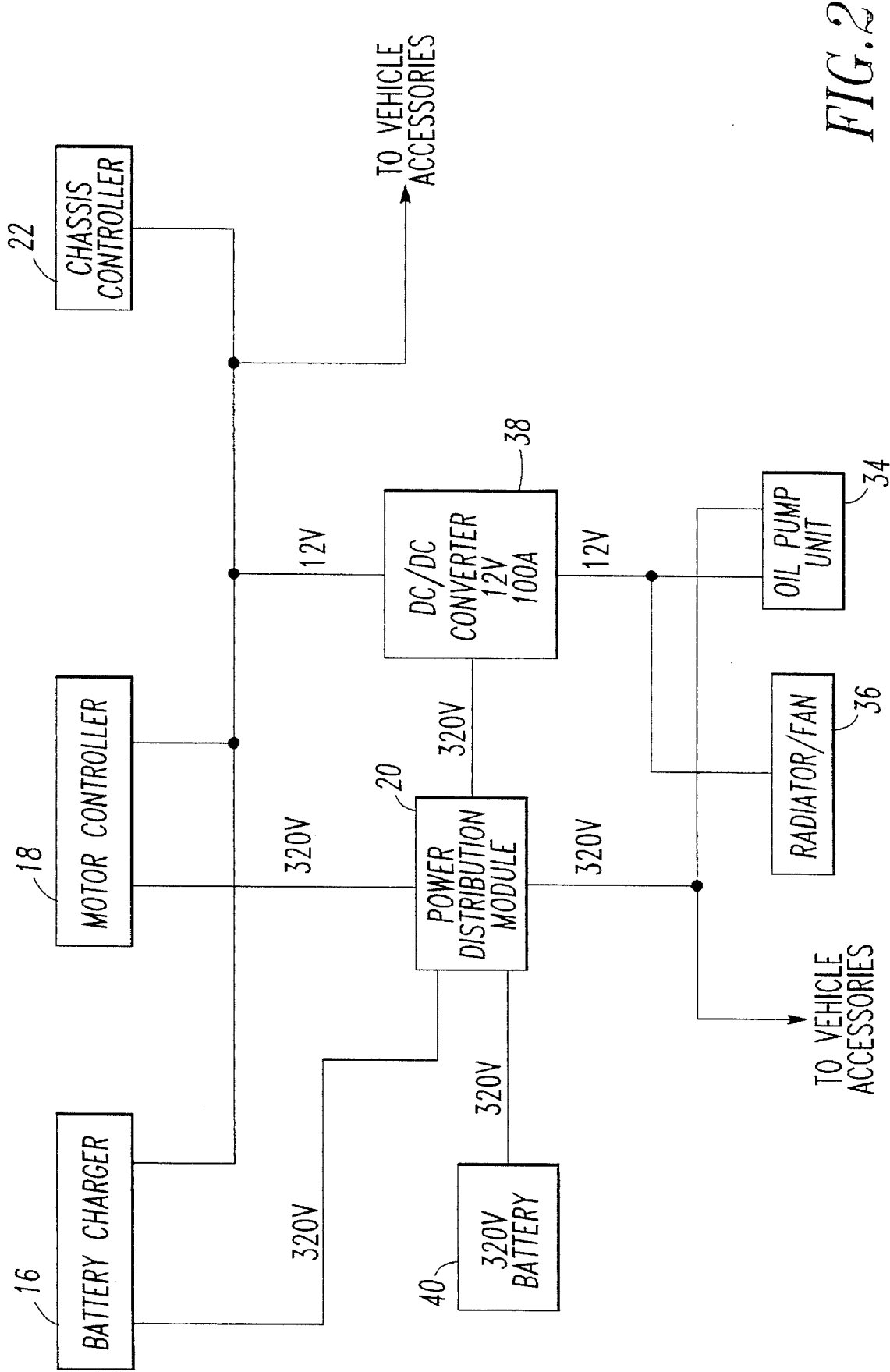
FIG. 2 is a power distribution diagram of the electric vehicle propulsion system of FIG. 1.

As shown in FIG. 2, the battery 40 serves as the primary source of power for the electric propulsion system 10. The battery 40 comprises, for example, a sealed lead acid battery, a monopolar lithium metal sulfide battery, a bipolar lithium metal sulfide battery, or the like, for providing a 320 volt output. Preferably, the electric propulsion system 10 works over a wide voltage range, e.g., 120 volts to 400 volts, to accommodate changes in the output voltage of the battery 40 due to load or depth of discharge. However, the electric vehicle propulsion system 10 is preferably optimized for nominal battery voltages of about 320 volts.

The power distribution module 20 is coupled to the output of the battery 40 and includes, among other things, fuses, wiring, and connectors for distributing the 320 volt output from the battery 40 to various components of the electric vehicle propulsion system 10. For example, the power distribution module 20 distributes the 320 volt output from the battery 40 to the motor controller 18, the DC/DC converter 38, the radiator/fan 36, the oil pump unit 34, and the battery charger 16. The power distribution module 20 also distributes the 320 volt output from the battery 40 to various vehicle accessories, which are external to the electric vehicle propulsion system 10. These vehicle accessories include, for example, an air conditioning system, a heating system, a power steering system, and any other accessories that may require a 320 volt power supply.

The DC/DC converter 38, which, as described above, is coupled to the 320 volt output of the power distribution module 20, converts the 320 volt output of the power distribution module 20 to 12 volts. The DC/DC converter 38 then supplies its 12 volt output as operating power to the battery charger 16, the motor controller 18, the chassis controller 22, and the oil pump 34. The DC/DC converter 38 also supplies its 12 volt output as operating power to various vehicle accessories, which are external to the electric vehicle propulsion system 10. These vehicle accessories include, for example, vehicle lighting, an audio system, and any other accessories that may require a 12 volt power supply. It should be appreciated that the DC/DC converter 38 eliminates the need for a separate 12 volt storage battery.

Figure 6A:
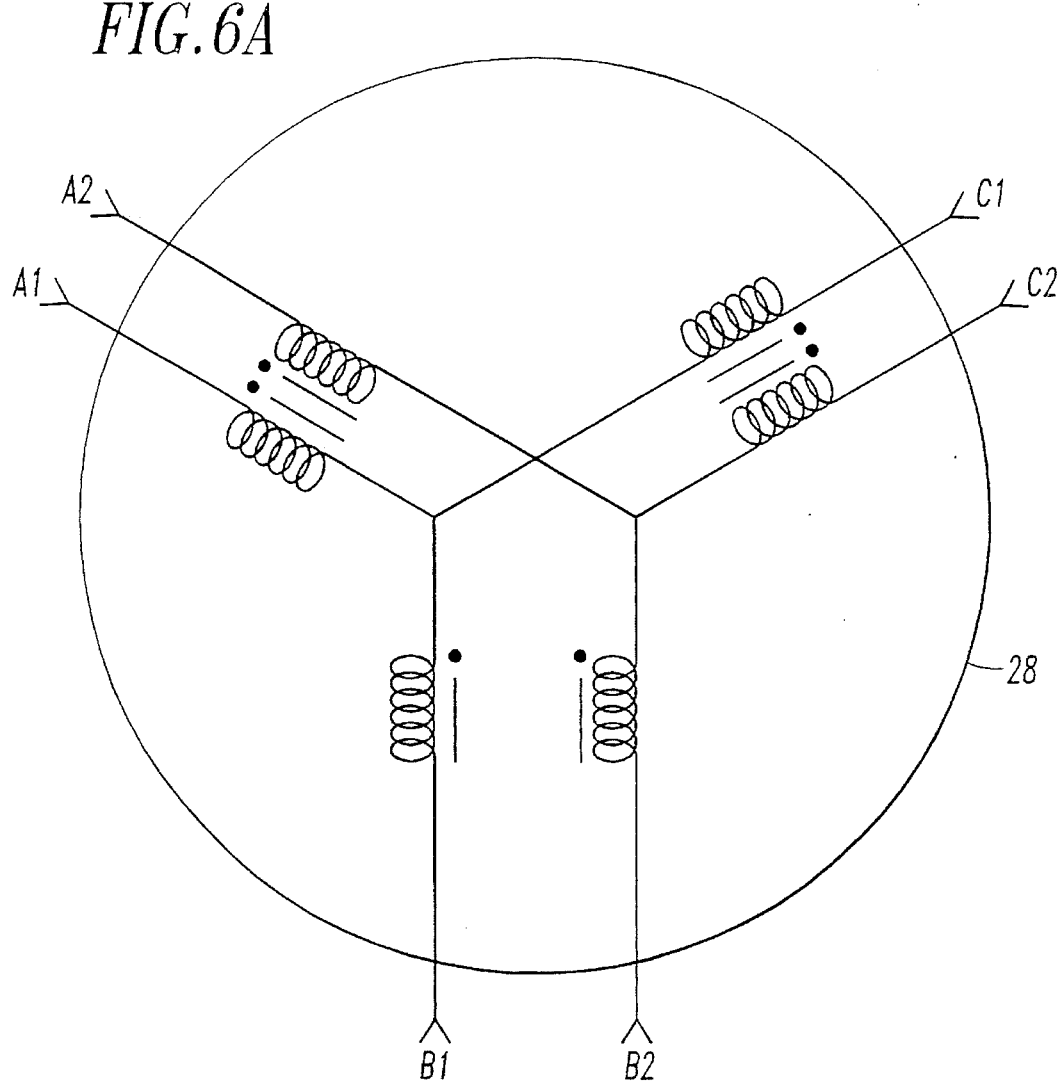
FIG. 6A is a schematic diagram of the motor of the electric vehicle propulsion system of FIG. 1.

As shown in FIG. 6A, the motor 28 is a 3-phase AC induction motor having two identical, electrically isolated, windings per phase (windings A1 and A2 are for the "A" phase, windings B1 and B2 are for the "B" phase, and windings C1 and C2 are for the "C" phase) for producing high torque at zero speed to provide performance comparable to conventional gas-driven engines. The shaft (not shown) of the motor 28 is coupled to the vehicle transaxle (not shown). Preferably, the two windings in each phase of the motor 28 are aligned substantially on top of one another and are electrically in phase such that each winding provides approximately half the total power of the phase. Also the motor 28 is preferably completely sealed and utilizes spray-oil cooling to remove heat directly from the rotor and end windings to increase reliability.

Operation of the electric vehicle propulsion system 10 will now be described with reference to FIGS. 3–5 and 7–10.

Figure 3:
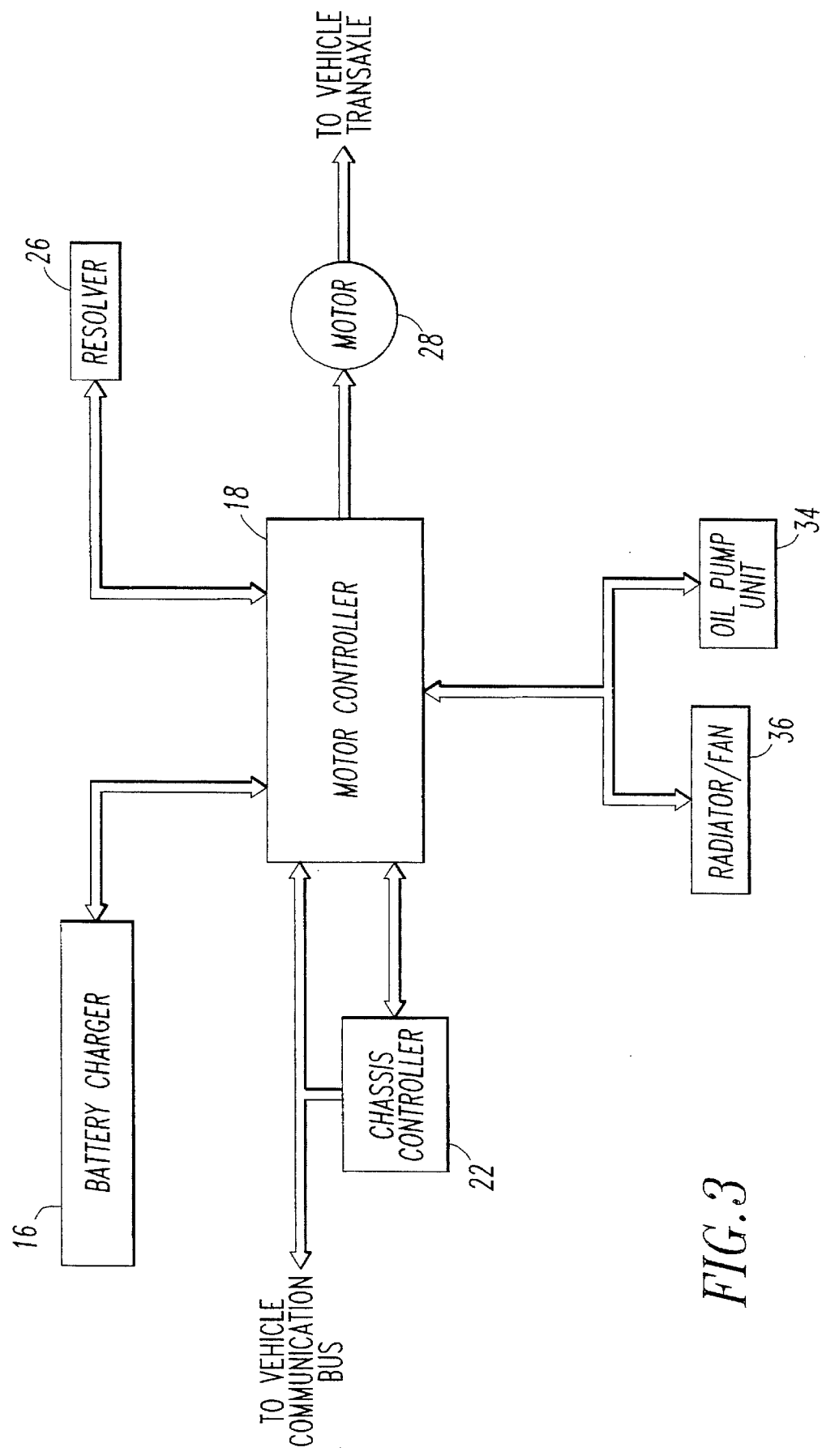
FIG. 3 is a functional diagram of the electric vehicle propulsion system of FIG. 1.
Figure 4:
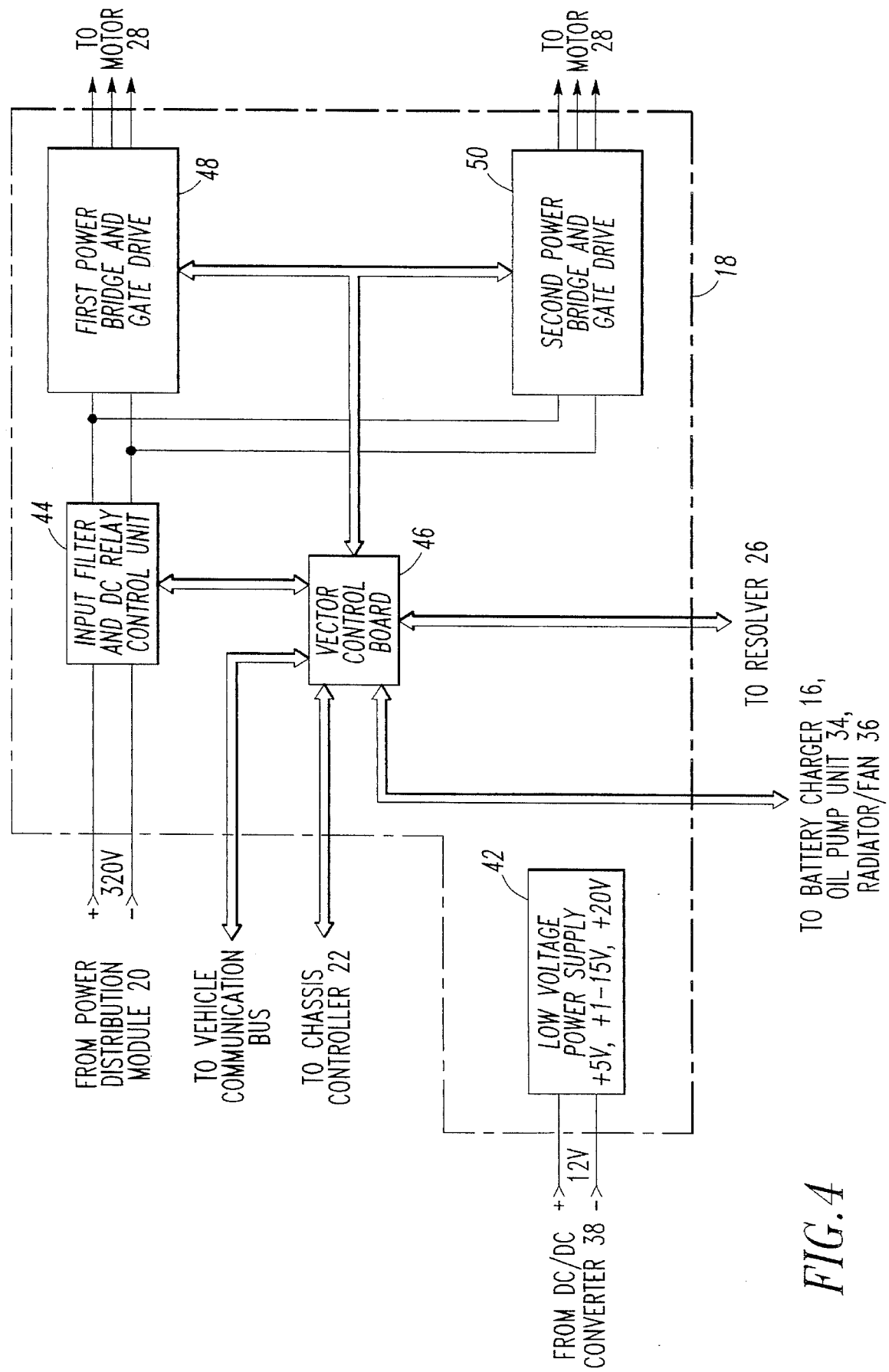
FIG. 4 is a functional diagram of the motor controller of the electric vehicle propulsion system of FIG. 1.

As shown in FIGS. 3 and 4, the components of the electric vehicle propulsion system 10 are interconnected via various data busses. The data busses can be of the electrical, optical, or electro-optical type as is known in the art.

The battery charger 16 receives command signals from and sends status signals to the motor controller 18 for charging the battery 40. The battery charger 16 provides a controlled battery charging current from an external AC power source (not shown). Preferably, AC current is drawn from the external source at near-unity power factor and low harmonic distortion in compliance with expected future power quality standards. Further, the battery charger 16 is preferably designed to be compatible with standard ground fault current interrupters and single-phase power normally found at residential locations.

Figure 5:
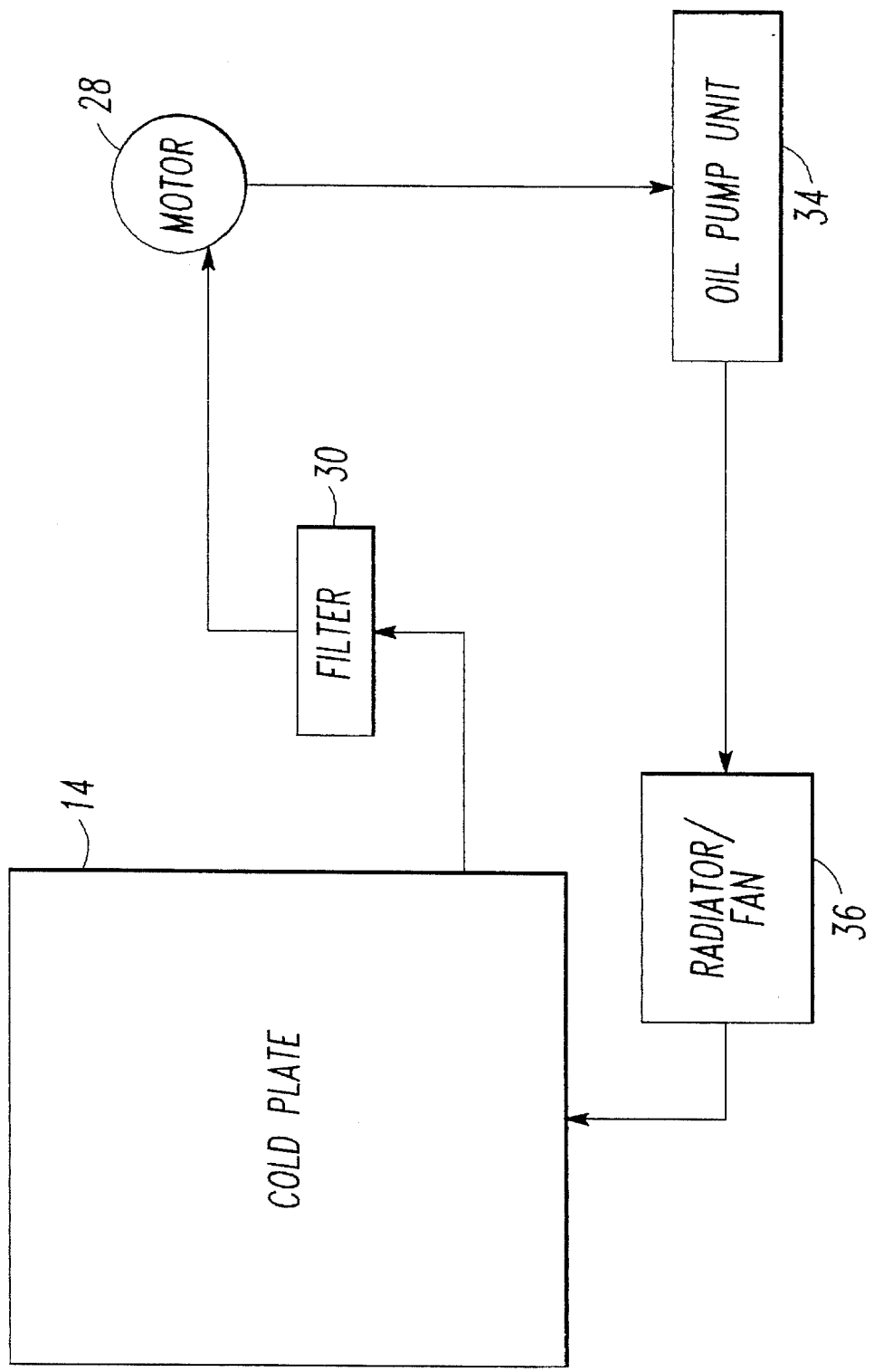
FIG. 5 is cooling diagram of the electric vehicle propulsion system of FIG. 1.

The oil pump unit 34 and radiator/fan 36 also receive command signals from and send status signals to the motor controller 18. As shown in FIG. 5, the electric vehicle propulsion system 10 utilizes a closed loop cooling system including the cold plate 14, the filter 30, the motor 28, the oil pump unit 34, and the radiator/fan 36. Preferably, the cold plate 14 is a hollow body having a double-sided surface on which the battery charger 16, the motor controller 18, and the power distribution module 20 are mounted in thermal contact. It is contemplated that the DC/DC converter 38 can also be mounted in thermal contact with the cold plate 14. The oil pump unit 34 circulates oil, e.g., aircraft turbine oil, from the oil reservoir of the motor 28 through the radiator/fan 36, the cold plate 14, the filter 30, and back through the motor 28 as shown in FIG. 5. Heat is removed from the oil by the radiator/fan 38 and the oil is filtered by the filter 30, which can comprise a commercially available oil filter know in the art. Preferably, the oil pump unit 34 is controlled by the motor controller 18 to provide a variable rate of oil flow. It should be appreciated that the closed loop oil cooling system of FIG. 5 protects the electric vehicle propulsion system 10 from the harsh automotive operating environment, thus increasing reliability and reducing maintenance. Further, because the same oil used for lubricating the motor 28 is also used for cooling of the system control unit 12, the cooling system can have a simplified design.

Figure 6B:
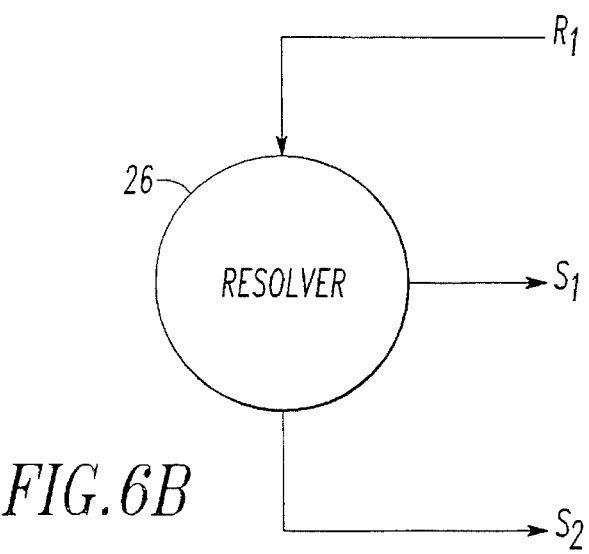
FIG. 6B is a schematic diagram of the resolver of the electric vehicle propulsion system of FIG. 1.

The resolver 26 is illustrated in FIG. 6B and is positioned proximate to the motor 28 for detecting the angular position of the motor shaft and for providing signals indicative of the angular position of the motor shaft to the motor controller 18. The reference signal line $R_1$ connected to the resolver is for a positive or negative reference value indicating the angular position of the motor shaft. The $S_1$ signal line from the resolver provides a positive or negative sine value for the angular position of the motor shaft and the $S_2$ signal line from the resolver provides a positive or negative cosine value for the angular position of the motor shaft.

The resolver 26 can comprise a commercially available resolver or other resolver known in the art. As explained in more detail below, reference signals for the resolver 26 are provided by the motor controller 18.

The chassis controller 22 and the motor controller 18 receive signals from a vehicle communication bus. Generally, the vehicle communication bus serves as a communication pathway for interfacing various vehicle sensors and controllers to the chassis controller 22 and the motor controller 18, as will be explained in more detail below.

The chassis controller 22 comprises a microprocessor-based digital and analog electronics system and provides control and status interfacing to the vehicle's sensors and controllers and to the motor controller 18. For example, the chassis controller 22 is connected, via the vehicle communication bus, to the vehicle key switch, accelerator, brake, and drive selector switches. The chassis controller 22 interprets signals from these switches to provide the motor controller 18 with start-up, drive mode (e.g., forward, reverse, and neutral), motor torque, regenerative braking, shutdown, and built-in test (BIT) commands. Preferably, the chassis controller 22 communicates with the motor controller 18 via an opto-coupled serial data interface and receives status signals from the motor controller 18 of all the commands sent to verify the communication links between the chassis controller 22, the vehicle, and the motor controller 18 and to verify that the vehicle is operating properly. It should be appreciated that because the chassis controller 22 provides the control and status interfacing to the vehicle's sensors and controllers and to the motor controller 18, the electric vehicle propulsion system 10 can be modified for use with any number of different vehicles simply by modifying the chassis controller 22 for a particular vehicle.

The chassis controller 22 also provides battery management capabilities by using signals received over the vehicle communication bus from a battery current sensor located in the power distribution module 20. The chassis controller 22 interprets signals from the battery current sensor, provides charging commands to the motor controller 18, and sends a state-of-charge value to a "fuel" gage on the vehicle dashboard. The chassis controller 22 further connects, via the vehicle communication bus, to vehicle controllers including odometer, speedometer, lighting, diagnostic and emissions controllers, as well as to an RS-232 interface for system development.

As shown in FIG. 4, the motor controller 18 includes a low voltage power supply 42, an input filter and DC relay control unit 44, a vector control board 46, and first and second power bridges and gate drives 48 and 50, respectively.

The low voltage power supply 42 converts the 12 volt output from the DC/DC converter 38 to provide +5 V, ±15 V, and +20 V outputs to the input filter and DC relay control unit 44, the vector control board 46, the first power bridge 48, and the second power bridge 50. The low voltage power supply 42 can comprise a commercially available power supply as is known in the art.

The input filter and DC relay control unit 44 includes electrical connections for coupling the 320 volt output of the power distribution module 20 to the first and second power bridges 48 and 50, respectively. The input filter and DC relay control unit 44 includes EMI filtering, a relay circuit for disconnecting the coupling of the 320 volt output of the power distribution module 20 to the first and second power bridges 48 and 50, respectively, and various BIT circuits including voltage sense circuits and a chassis ground fault circuit. Preferably, the input filter and DC relay control unit 44 receives control signals from and sends status signals, e.g., BIT signals, to the vector control board 46.

Figure 7:
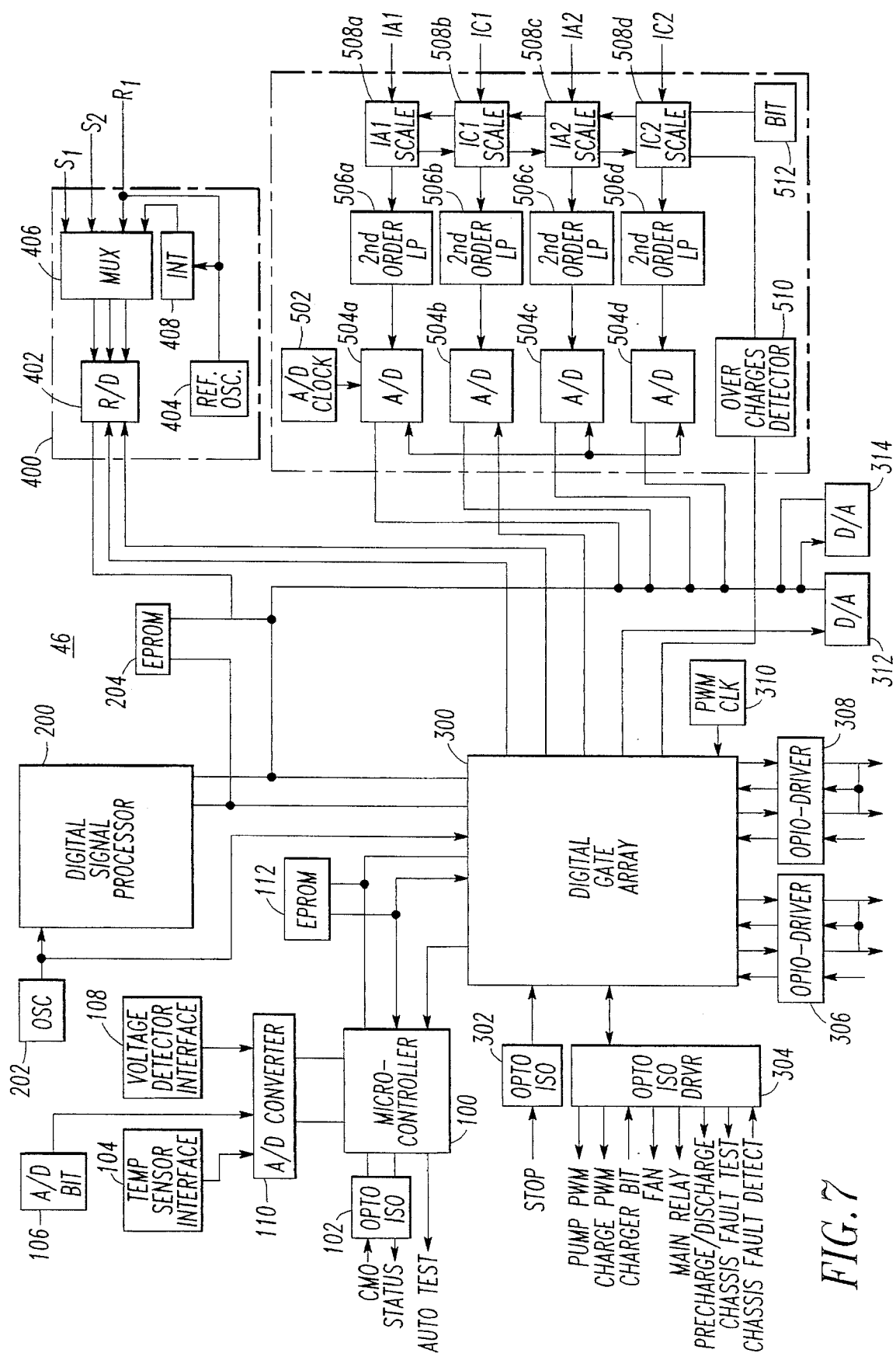
FIG. 7 is a schematic diagram of the vector control board of the motor controller of FIG. 4.

As shown in FIG. 7, the vector control board 46 comprises a microcontroller 100, a digital signal processor 200, a digital gate array 300, a resolver interface 400, and an analog interface 500. Clock signals for the microcontroller 100, the digital signal processor 200, and the digital gate array 300 are provided by an oscillator 202.

The resolver interface 400 includes an R/D converter 402, a reference oscillator 404, a multiplexor 406, and a BIT circuit 408. The resolver interface 400 receives via the multiplexer 406 rotor position measurements in the form of signals S1 and S2. The R/D converter 402 then converts the signals S1 and S2 to digital values. As explained above, the signals S1 and S2 are produced by the resolver 26 and are indicative of the angular position of the shaft of the motor 28. The resolver interface 400 also provides reference signals to the resolver 26. In particular, the reference oscillator 404 produces reference waveforms which are supplied to the resolver 26 as signal R1 via the multiplexor 406. The BIT circuit 408 performs BIT operations to test the operation of the resolver interface 400.

The analog interface 500 includes an A/D clock, a plurality of A/D converters 504a–d, a plurality of antialiasing filters 506a–d, a plurality of current scalers 508a–d, an over current detector 510, and a BIT circuit 512. The analog interface 500 receives and processes current measurements in the form of signals IA1, IC1, IA2, and IC2 from current sensors (not shown) located at the first and second power bridges 48 and 50, respectively. The current sensors are preferably coupled to the windings A1, A2, C1, and C2 of the motor 28. The signals IA1, IC1, IA2, and IC2 are received and scaled by the current scalers 508a–d, filtered by the antialiasing filters 506a–d, and then converted to digital values by the A/D converters 504a–d. The overcurrent detector 510 detects overcurrents in the current scalers 508a–d and the BIT circuit 512 performs BIT operations to test the operation of the analog interface 500.

The microcontroller 100 comprises, for example, a microcontroller selected from the Motorolla 68HC11 family of microcontrollers or other similar device known in the art. As its main function, the microcontroller 100 performs various housekeeping functions of the vector control board 46. For example, the microcontroller 100 communicates with the chassis controller 22 by receiving current commands, BIT commands, torque commands, and mode commands from, and sending status signals to the chassis controller 22 via an opto-isolator 102. The microcontroller 100 also communicates with the digital signal processor 200 by providing the digital signal processor 200 with torque requests via the digital gate array 300, and communicates with the digital gate array 300 to perform, for example, various BIT and control operations. Preferably, the microcontroller 100 includes a combination of RAM, ROM, and EEPROM for storing program instructions for controlling its operation. Alternatively, some or all of the program instructions can be stored in an EPROM 112.

The microcontroller 100 also receives analog input signals from a temperature sensor interface 104, an A/D BIT circuit 106, and a voltage detector interface 108 via an A/D converter 110. The A/D converter 110 is preferably part of the microcontroller 100.

The analog input signals from the temperature sensor interface 104 include temperature signals transmitted by temperature sensors (not shown) located on the cold plate 14 in proximity to the first and second power bridges 48 and 50, respectively. The analog input signals from the A/D BIT circuit 106 include voltage test signals for testing the A/D converter 110. The analog input signals from the voltage detector interface 108 include voltage signals transmitted by voltage detectors (not shown) located in the input filter and DC relay control unit 44.

The digital signal processor 200 comprises, for example, a Texas Instrument TMS320C50 digital signal processor or other similar device known in the art. As its main function, the digital signal processor 200 implements a torque control program stored in an EPROM 204 and down loaded to RAM located in the digital signal processor 200 upon start up of the electric vehicle propulsion system 10. Alternatively, the digital signal processor 200 may be preprogrammed to include the torque control program.

In particular, the digital signal processor 200 receives the digitized rotor position measurements from the resolver interface 400, the digitized current measurements from the analog interface 500, and torque commands from the microcontroller 100 and uses these measurements and commands to generate phase voltage signals. As will be explained in more detail below, these phase voltage signals are supplied to the digital gate array 300, whereby the digital gate array 300 produces pulse width modulated (PWM) voltage waveforms in the form of gate drive signals to produce desired acceleration or braking effects in the motor 28. The phase voltage signals, and thus the PWM voltage waveforms, are generated in accordance with the torque control program which is designed to result in a requested torque output. Implementation of the torque control program by the digital signal processor 200 will now be described with reference to FIGS. 8 and 9.

As shown in FIG. 7, the microcontroller 100 sends a torque request to the digital signal processor 200 through the digital gate array 300. The torque request corresponds to the torque command from the chassis controller 22 to the microcontroller 100. However, the amount of torque sent from the chassis controller 22 may not match the torque request to the DSP 200 because torque amount is subject to present conditions such as current temperature, battery supply availability and current speed, for example. These conditions are sensed by the microcontroller 100 and sends a torque request to the DSP incorporating the conditions.

Figure 8:
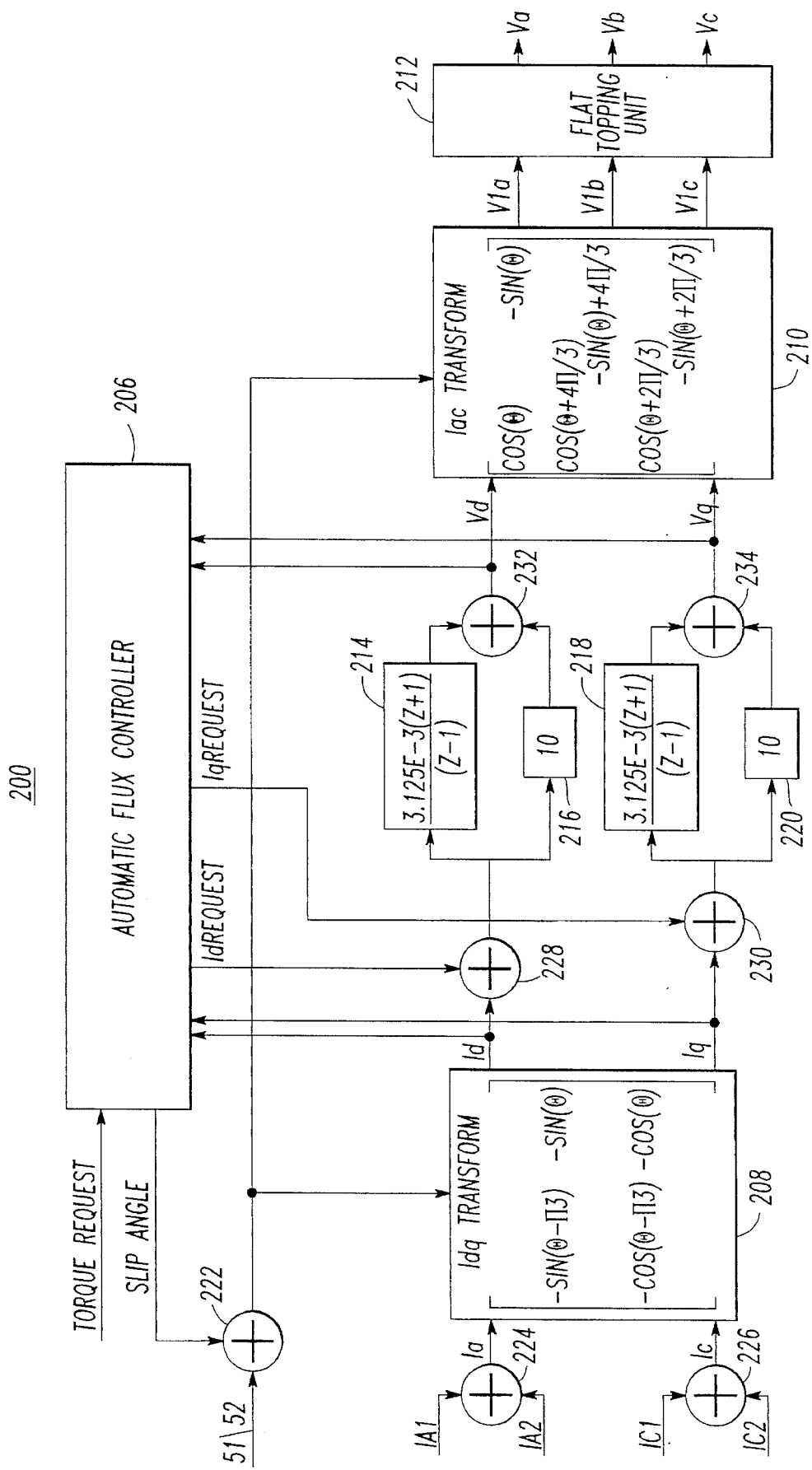
FIG. 8 is a functional diagram of the digital signal processor of the vector control board of FIG. 7.

The DSP 200 receives information on the amount of current in the motor through the analog interface 500 (FIG. 7), which samples the current using the A/D converters 504a, 504b, 504c and 504d. The current from phases A and C are required only. As shown in FIG. 8, currents, IA1 and IA2 from phase A are added by an adder 224 to produce Ia and currents IC1 and IC2 from phase C are added by an adder 226 to produce Ic. An Idq Transform 208 converts Ia and Ic to a direct component Id and quadrature component Iq, which represent Cartesian coordinates of the stator current demand vector signal in a synchronously rotating reference frame (see U.S. Pat. No. 5,168,204 for a detailed explanation).

Figure 9:
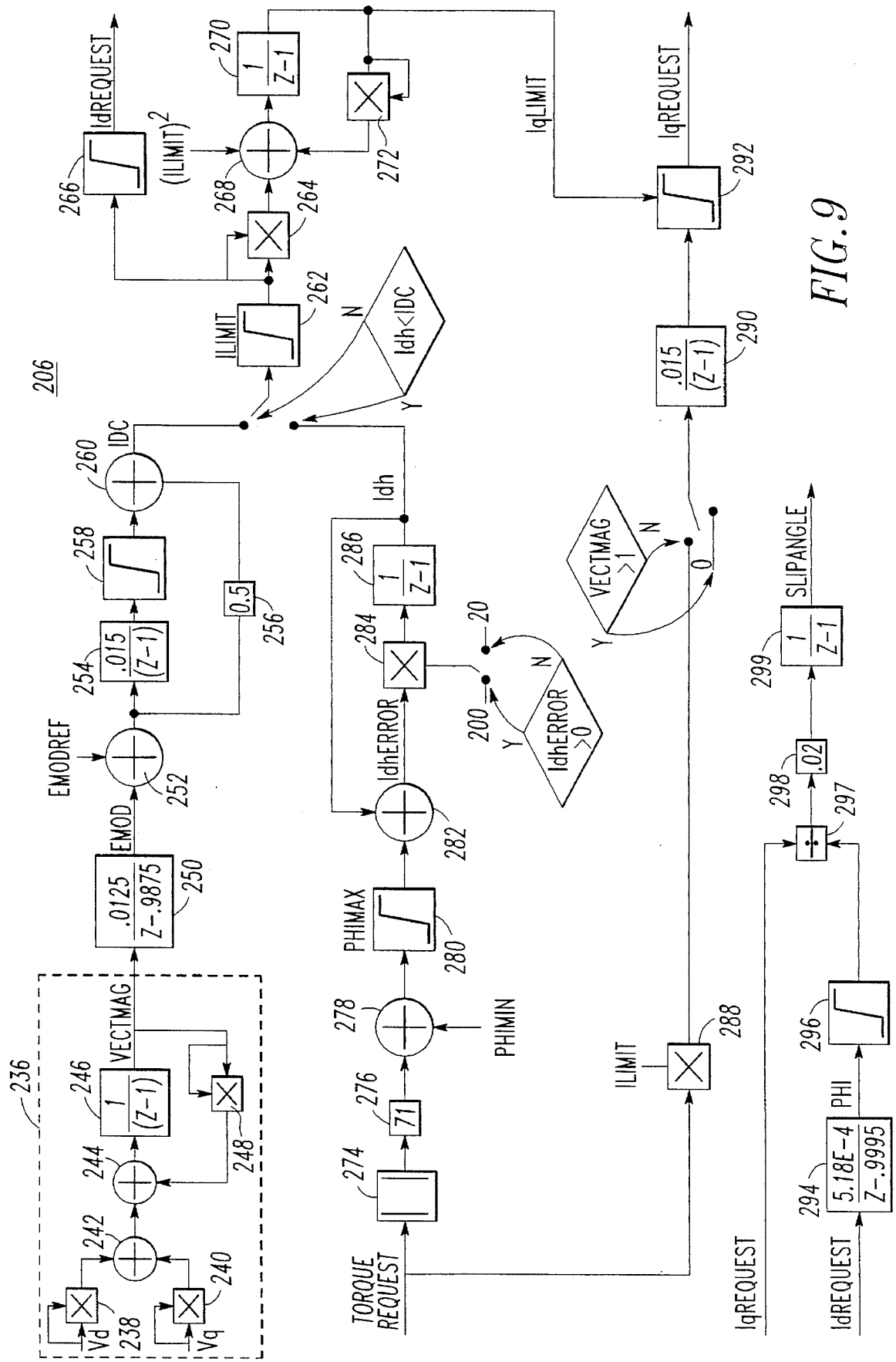
FIG. 9 is a functional diagram of the automatic flux controller of the digital signal process of FIG. 8.

The DSP 100 performs an algorithm according to the torque request using an automatic flux controller (AFC) 206 within the DSP 100. The function of an automatic flux controller is explained in U.S. Pat. No. 5,168,204 to Schauder, the content of which is incorporated by reference. As shown in FIG. 9, the AFC 206 receives the torque request and generates IdRequest (field component) and IqRequest (torque component), which contain the proper amount of torque and field. The field component is based on the fields on the rotor and stator which opposed each other to create the torque. If maximum voltage is being applied and additional torque is requested (usually this occurs at higher speeds), then the field on the rotor is decreased to allow faster speed. Thus, if the current voltage being used is high, then the rotor can be controlled (field weakening control) to be reduced to provide higher vehicle speed. However, in this field weakening method, torque and acceleration is lower (since more power is needed to accelerate at higher speeds than at lower speeds).

The voltage currently being applied, Emod, is subtracted from the maximum voltage available EmodRef by subtractor 254. Emod is obtained from voltage vectors Vd and Vq. The voltage vectors Vd and Vq are obtained from Id and Iq from the Idq transform 208 through transform functions 214 and 218. The vector magnitude (VectMag) of Vd and Vq is determined from unit 236. The vector magnitude goes through a filter 250 to produce the voltage Emod. The subtracted result goes through a proportional plu integral process (254, 256, 258, and 260) to control IDC to achieve and increased speed. This process is called a high speed torque control as opposed to a low speed torque process which is used when sufficient voltage is remaining (usually at low speeds) to accelerate the vehicle with maximum torque. The low speed torque process is shown with labels 274, 276, 278, 280, 282, 284 and 286. This process outputs the torque available at present conditions (Idh).

Idh and IDC is compared and if IDC is less than Idh, i.e., there is not enough voltage remaining, then field weakening method is used to increase the speed. However, if IDC is greater than Idh, i.e., there is enough voltage remaining, then field is not changed and higher torque and acceleration is possible. Both methods output corresponding IdRequest (field component) and limit IqRequest (torque component) through 262, 264, 268, 270, 272, 292. IdRequest and IqRequest are then used to generate an appropriate SlipAngle, which is output from the automatic flux controller 206.

The SlipAngle plus rotor position (222), Vd and Vq are input to an Iac Transform 210 to convert back to the original coordinate system. The iac Transform 210 outputs corresponding voltage reference signals V1a, V1b and V1c corresponding to the torque request to a flat-topping unit 212 to increase the signal amplitude before applying these reference signals to the pulse width modulator.

In addition to implementing the torque control program, the digital signal processor 200 also performs various BIT operations, control functions, and diagnostic testing, as will be explained in more detail below. D/A converters 312 and 314 are provided for converting digital diagnostic test data produced by the digital signal processor 200 into analog signals during diagnostic testing of the digital signal processor 200 and the system 10 by an external testing device (not shown).

The digital gate array 300 comprises, for example, a field programmable gate array or other similar device known in the art. Generally, the digital gate array 300 receives the phase voltage signals va, Vb, and Vc from the digital signal processor 200 and produces PWM voltage waveforms in the form of gate drive signals A1U, A1L, B1U, B1L, C1U, C1L and gate drive signals A2U, A2L, B2U, B2L, C2U, and C2L for driving the first and second power bridges 48 and 50, respectively. The digital gate array 300 also generates and transmits via an opto-isolator driver 304 various PWM signals (e.g., "Pump PWM" and "Chrgr PWM") for controlling the oil pump unit 34 and the battery charger 16, as well as various control signals (e g., , "Fan" "Main Relay, " "Precharge/Discharge Relay," and "Chassis Fault Test") for controlling the radiator/fan 36, main and precharge/discharge relays (not shown) located in the input filter and DC relay control unit 44, and a chassis fault detection unit also located in the input filter and DC relay control unit 44. Further, the digital gate array 300 receives BIT signals (e.g., "Chrgr BIT") and fault detect signals (e.g., "Chassis Fault Detect") via the opto-isolator driver 304, and receives operator initiated emergency stop signals (e.g., "Stop") via the opto-isolator 302. A more detailed description of the digital gate array 300 will now be described with reference to FIG. 10.

Figure 10:
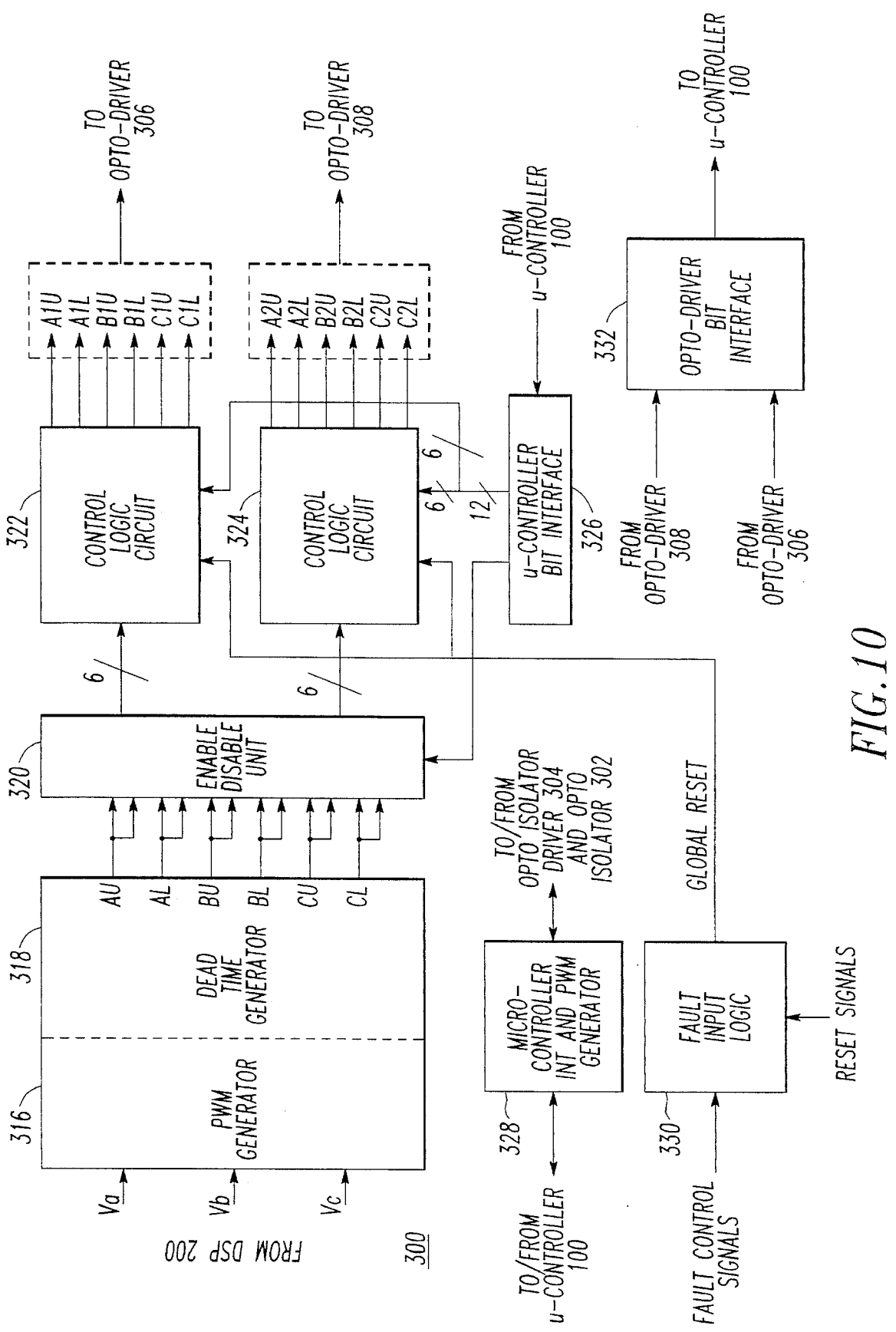
FIG. 10 is a functional diagram of the digital gate array of the vector control board of FIG. 7.

As shown in FIG. 10, the digital gate array 300 includes a PWM generator 316, a dead time generator 318, an enable/disable unit 320, control logic circuits 322 and 324, and a microcontroller BIT interface 326. As also shown in FIG. 10, the digital gate array 300 further includes a microcontroller interface and PWM generator 328, fault input logic 330, and an opto-driver BIT interface 332.

The phase voltage signals Va, Vb, and Vc from the digital signal processor 200 are received by the PWM generator 316 and the dead time generator 318. The PWM generator 316 and the dead time generator 318 produce PWM voltage signals AU, A1, BU, BL, CU, and CL from the phase voltage signals Va, Vb, and Vc.

Each of the PWM signals AU, A1, BU, BL, CU, and CL produced by the PWM generator 316 and the dead time generator 318 is split into two identical signals resulting in two sets of the PWM signals. The two sets of the PWM signals AU, A1, BU, BL, CU, and CL are applied to the enable/disable unit 320 and the control logic circuits 322 and 324, as shown in FIG. 10, to produce the gate drive signals A1U, A1L, B1U, B1L, C1U, and C1L and the gate drive signals A2U, A2L, B2U, B2L, C2U, and C2L. The gate drive signals A1U, A1L, B1U, B1L, C1U, and C1L from the control logic circuit 322 are applied to the first power bridge 48 via the opto-driver 306, while the gate drive signals A2U, A2L, B2U, B2L, C2U, and C2L from the control logic circuit 324 are applied to the second power bridge 50 via the to opto-driver 308.

The enable/disable unit 320 prevents the flow of the PWM signals AU, A1, BU, BL, CU, and CL from the dead time generator 318 to the control logic circuits 322 and 324 in accordance with BIT signals produced by the microcontroller 100. The enable/disable unit 320 receives these BIT signals from the microcontroller 100 via the microcontroller interface 326. Once the microcontroller 100 causes the enable/disable unit 320 to prevent the flow of the PWM signals AU, A1, BU, BL, CU, and CL from the dead time generator 318 to the control logic circuits 322 and 324, the microcontroller 100 can provide its own gate drive signals to the control logic circuits 322 and 324 via the microcontroller BIT interface 326. Thus, the microcontroller 100 can override control of the digital gate array 300 by the digital signal processor 200. Such overriding of control by the microcontroller 100 may be desirable, for example, should the digital signal processor 200 malfunction and during BIT of the system 10.

The microcontroller interface and PWM generator 328 includes a PWM generator and interface electronics for receiving commands from the microcontroller 100 and for producing PWM and control signals for controlling the oil pump unit 34, the battery charger 16, the radiator/fan 36, the main and precharge/discharge relays, and the chassis fault detection unit as described above. The microcontroller interface and PWM generator 328 also receives BIT and fault detect signals from the battery charger 16 and chassis fault detection unit, respectively, and operator initiated emergency stop signals and provides the received signals to the microcontroller 100.

The fault input logic 330 serves as an interface between various fault and reset circuits in the electric vehicle propulsion system 10 and the digital gate array 300. Upon receiving appropriate fault control and reset signals, the fault input logic 330 transmits a global reset to the control logic circuits 322 and 324. The fault control signals include, for example, an undervoltage signal from the low voltage power supply 42, an operator-initiated emergency shut down signal, a watchdog timer signal, a power reset signal, BIT signals from the resolver interface 400, and an overcurrent detection signal from the overcurrent detector 510. The reset signals are generated by the microcontroller 100.

The opto-driver BIT interface 332 receives BIT data from the opto-drivers 306 and 308 and provides the BIT data to the microcontroller 100 for processing. The BIT data from the opto-drivers 306 and 308 is used by the microcontroller 100 to test the gate drive signals A1U, A1L, B1U, B1L, C1U, and C1L and the gate drive signals A2U, A2L, B2U, B2L, C2U, and C2L provided by the control logic circuits 322 and 324, respectively. The BIT data from the opto-drivers 306 and 308 is used by the microcontroller 100 to test the first and second power bridges 48 and 50, respectively.

As stated above, the microcontroller 100 of the vector control board 46 is, for example, an 68HC11 microcontroller manufactured by Motorola Corp. U.S.A. The microcontroller 100 includes a memory that stores program instructions and other data that the microcontroller 100 uses to control some of the operations of the vector control board 46. These instructions are also used to change the current state of the microcontroller 100. The various states (or modes of operation) for the microcontroller 100 will be described in detail below.

Figure 11:
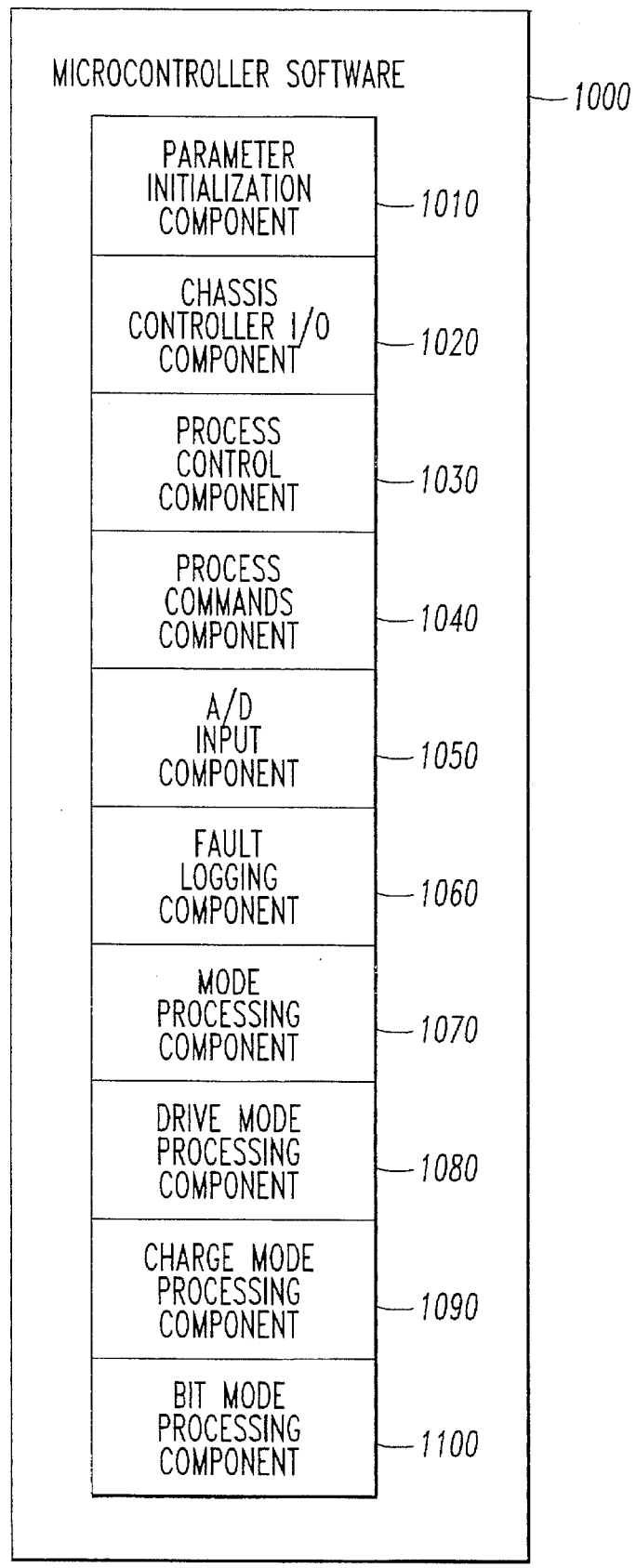
FIG. 11 is a block diagram illustrating the components of the motor controller software.

The stored program instructions in the memory of the microcontroller 100 include the microcontroller software 1000 (FIG. 11). The microcontroller software 1000 consists of ten components: parameter initialization component 1010, chassis controller I/O (input/output) component 1020, process control component 1030, process commands component 1040, A/D (analog-to-digital) inputs component 1050, fault logging component 1060, mode processing component 1070, drive mode processing component 1080, charge mode processing component 1090, and BIT (built-in-test) mode processing component 1100. In general, instructions from all of these components are used by the microcontroller 100 to monitor and receive various inputs and output signals used to control the operations of the vector control board 46. Details on each of the components will be discussed below.

1. PROCESS CONTROL COMPONENT

The process control component 1030 includes the instructions that the microcontroller 100 generally uses to control its processing functions. These instructions are represented by the steps in FIG. 14. After the microcontroller 100 is powered on, it runs various built-in-tests (step 4010). The functions and operations of built-in-tests ("BIT") are generally known. In this case, the built-in-tests ensure that major functions of the microcontroller 100 are operational and that it can communicate with the various other components of the vector control board 46. Once these power on BIT tests are completed, the microcontroller 100 enters neutral mode 9005 (see e.g., FIG. 19).

Additional details on the neutral mode 9005 will be described in detail. In general, the microcontroller 100 in neutral mode 9005 accepts and responds to status request and mode change commands from the chassis controller 22. In response to status request commands the microcontroller 100 returns requested status information to the chassis controller 22. Details on the chassis controller 22 and serial interface connecting the chassis controller 22 to the microcontroller 100 are included in copending U.S. patent application Ser. No. 08/258,628 (Westinghouse Case No. 58,347) entitled "ELECTRIC VEHICLE CHASSIS CONTROLLER" filed on the same day as this application. A mode change command will cause the microcontroller 100 to transition to the requested mode of operation, but transitions out of the neutral mode 9005 are only permitted if the power on BIT tests (step 4010) are completed successfully. It is important to note that transitions to different modes of operation is not automatic when the microcontroller 100 receives a mode change command. Rather, various substates are entered and corresponding conditions must be satisfied before transitions between substates and eventually to a mode of operation. Additional details on these aspects of the operation of the microcontroller 100 will be discussed in detail below.

The microcontroller 100 then executes the instructions of the parameter initialization component 1010 (step 4020). The instructions of the parameter initialization component 1010 will be discussed below with reference to FIG. 12.

After the microcontroller 100 completes executing the instructions of the parameter initialization component 1010, it initializes an RTI (real time interrupt) (step 4030). The real time interrupt is used to manage execution of the instructions of the mode processing component 1070. For example, the microcontroller 100 executes the instructions of the mode processing component 1070 every 10 milliseconds. The real time interrupt is thus set accordingly to ensure that the microcontroller 100 executes the instructions of the mode processing component 1070 every 10 milliseconds.

Then, the microcontroller 100 initializes the chassis controller input/output (I/O) variables including counters, a command queue, and an interrupt used during operation of the instructions of the chassis controller I/O component 1020 (discussed in detail below with reference to the steps illustrated in FIG. 13). The interrupt corresponds to a special register in the microcontroller 100 that is used to both send and receive data between the chassis controller 22. The interrupt is triggered whenever the special register is holding data to be sent or received.

The microcontroller 100 then enters a loop repeatedly executing instructions represented by steps 4050–4080.

First in step 4050, the microcontroller 100 arms its "watchdog." The function and operation of the watchdog for the 68HC11 are well known. The watchdog for the microcontroller 100 is set at a predetermined value. The microcontroller 100 constantly counts down the watchdog from the set value. It also repeatedly resets the watchdog timer (see step 8000 of FIG. 18) during operation. But if an error occurred during processing of the instructions of the process control component 1030 or the mode processing component 1070, the real time interrupt task, causing instructions (i.e., step 4050 of FIG. 14 and step 8000 of FIG. 18) from either component not to be executed, then the watchdog would be triggered and the microcontroller 100 would reset itself. Also, whenever the microcontroller 100 resets itself, whether as a result of a watchdog error or as a result of the electric vehicle propulsion system 10 being started, the microcontroller 100 executes the various built-in-tests referred to above.

After arming the watchdog (step 4050), the microcontroller 100 executes the instructions of the process commands component 1040 (step 4060) followed by the instructions of the analog-to-digital (A/D) component 1050 (step 4070) and the fault logging component 1060 (step 4080) before arming the watchdog again in step 4050. Of course the watchdog is reset in step 8000 of the mode processing component 1070 every 10 milliseconds when instructions of that component 1070 are executed. Details on the instructions for each of these components 1040, 1050, and 1060 will be discussed below.

2. PARAMETER INITIALIZATION COMPONENT

Figure 12:
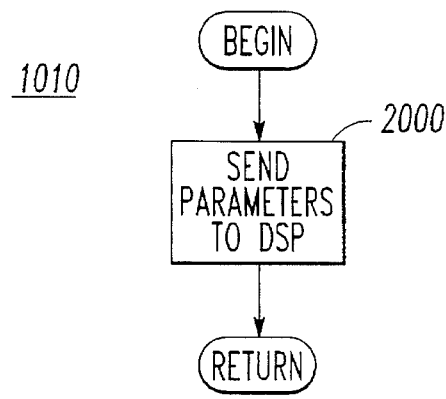
FIG. 12 is a flow chart illustrating the instructions of the parameter initialization component of the motor controller software.

The parameter initialization component 1010 initializes the parameters used by the remaining components 1020 and 1040–1100 of the microcontroller software 1000. The instructions for the parameter initialization component 1010 are illustrated in the step of FIG. 12. In step 2000, the microcontroller 100 initializes the various parameters used by the digital signal processor (DSP) 200. When doing this, the microcontroller 100 sets initial parameter values in the digital gate array 300.

For example, one set of parameters that the microcontroller 100 initializes includes time constant values used by the DSP 200 for efficient operation of the digital gate array 300 and the electric motor 28. Since all electric motors operate differently, using the microcontroller 100 to initialize the time constant values minimizes the need for reprogramming the DSP 200 when the motor controller 18 is operating a different electric motor.

3. CHASSIS CONTROLLER I/O (INPUT/OUTPUT) COMPONENT

Figure 13:
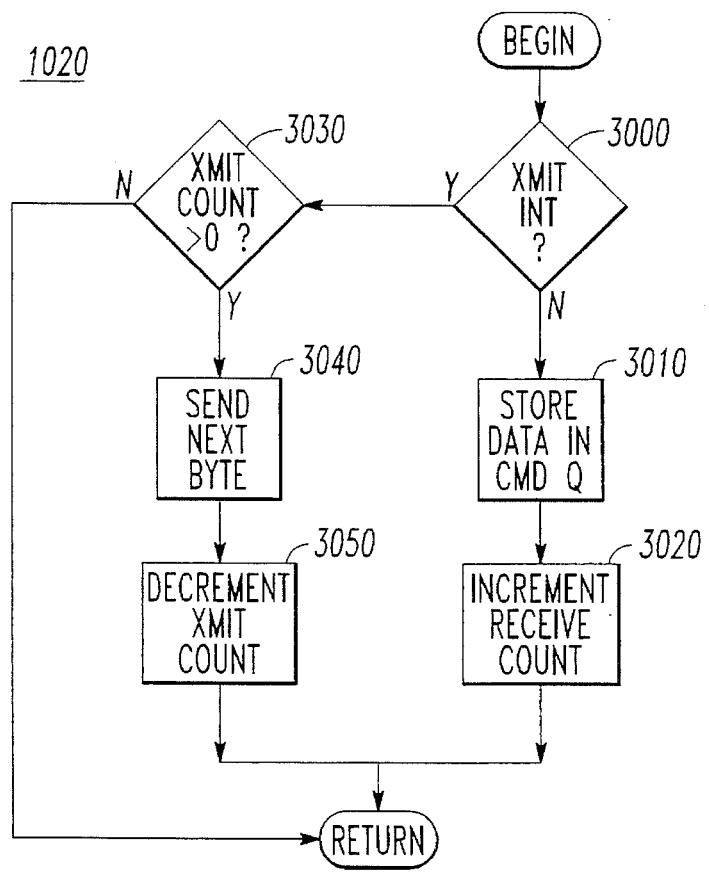
FIG. 13 is a flow chart illustrating the instructions of the chassis controller I/O component of the motor controller software.

FIG. 13 illustrates the steps that represent the instructions of the chassis controller input/output (I/O) component 1020 of the microcontroller software 1000. As with all instructions of the components 1000, the microcontroller 100 interprets and executes them. The chassis controller I/O component 1020 includes an asynchronous set of instructions that the microcontroller 100 executes whenever appropriate. For example, the microcontroller 100 executes instructions of the chassis controller I/O component 1020 when the interrupt of step 4040 (FIG. 14) is triggered, indicating that (1) the chassis controller 22 has sent a command (e.g., status request, mode change, and torque) to the microcontroller 100 via the serial interface discussed above or (2) the microcontroller 100 has, for example, a response to a status request or other command to send to the chassis controller 22.

It is important to note that if the communication link between the chassis controller 22 and the microcontroller 100 breaks down for any reason, the chassis controller 22 recognizes the breakdown, details of which are discussed in the copending application on the chassis controller 22 referred to above, but the microcontroller 100 also recognizes the break down in communication and automatically goes into the neutral mode 9005.

In step 3000, the microcontroller 100 determines whether the interrupt that triggered execution of the instructions for component 1020 is a transmit ("xmit") interrupt. Transmit interrupts occur whenever the microcontroller 100 has information to send to the chassis controller 22. First, in step 3030, the microcontroller 100 determines whether a transmit counter is greater than zero, indicating that it has some information for the chassis controller 22. If yes, then the microcontroller 100 knows that it is outputting information to the chassis controller 22 and sends the information (one byte) in step 3040. The microcontroller 100 then decrements the transmit counter in step 3050 to indicate that it sent a byte of information to the chassis controller 22. The transmit counter will be zero when all bytes of information have been sent to the chassis controller 22. Because the chassis controller I/O component is asynchronous, after the microcontroller 100 executes step 3050 it may return to an instruction for any one of steps 4050–4080 (FIG. 14) that was interrupted when the interrupt for chassis controller I/O was triggered.

Otherwise, a receive interrupt occurred (step 3000) and the microcontroller 100 stores a command from the chassis controller 22 in a command queue (step 3010) and increments a receive command counter (step 3020). Actually, each command from the chassis controller 22 consists of two or more bytes, the microcontroller 100 uses the command queue to store each byte until all bytes of a command have been received at which time the microprocessor 100 can respond to the complete command. As will be explained in detail below, the microcontroller 100 executes the commands from the chassis controller 22 in the sequence in which they are received from the chassis controller 22 by taking the commands off the queue and decrementing the receive command counter each time a command is taken off the queue.

Although the microcontroller 100 generally receives many types of commands from the chassis controller 22, two of these types are important to note. The first is a mode command. A mode command consists of three bytes of the information: the first byte simply indicates that the command is a mode command versus some other type of command; the second byte indicates the mode (e.g., neutral, drive, charge, and BIT); and the third byte is a checksum byte that is simply used to indicate the end of a command. The second type of command is a torque command. The torque command, like the mode command also consists of three bytes: the first byte indicates that it is a torque command (as opposed to some other command), the second byte indicates the torque value requested by the chassis controller 22; and the third byte is the checksum byte. Details on how the chassis controller 22 interprets driver inputs (accelerator and brake pedal positions) into torque values are specified in the copending application on the chassis controller 22, U.S. patent application Ser. No. 08/258,628 (Westinghouse Case No. 58,347) entitled "Electric Vehicle Chassis Controller."

4. PROCESS COMMANDS COMPONENT

Figure 15:
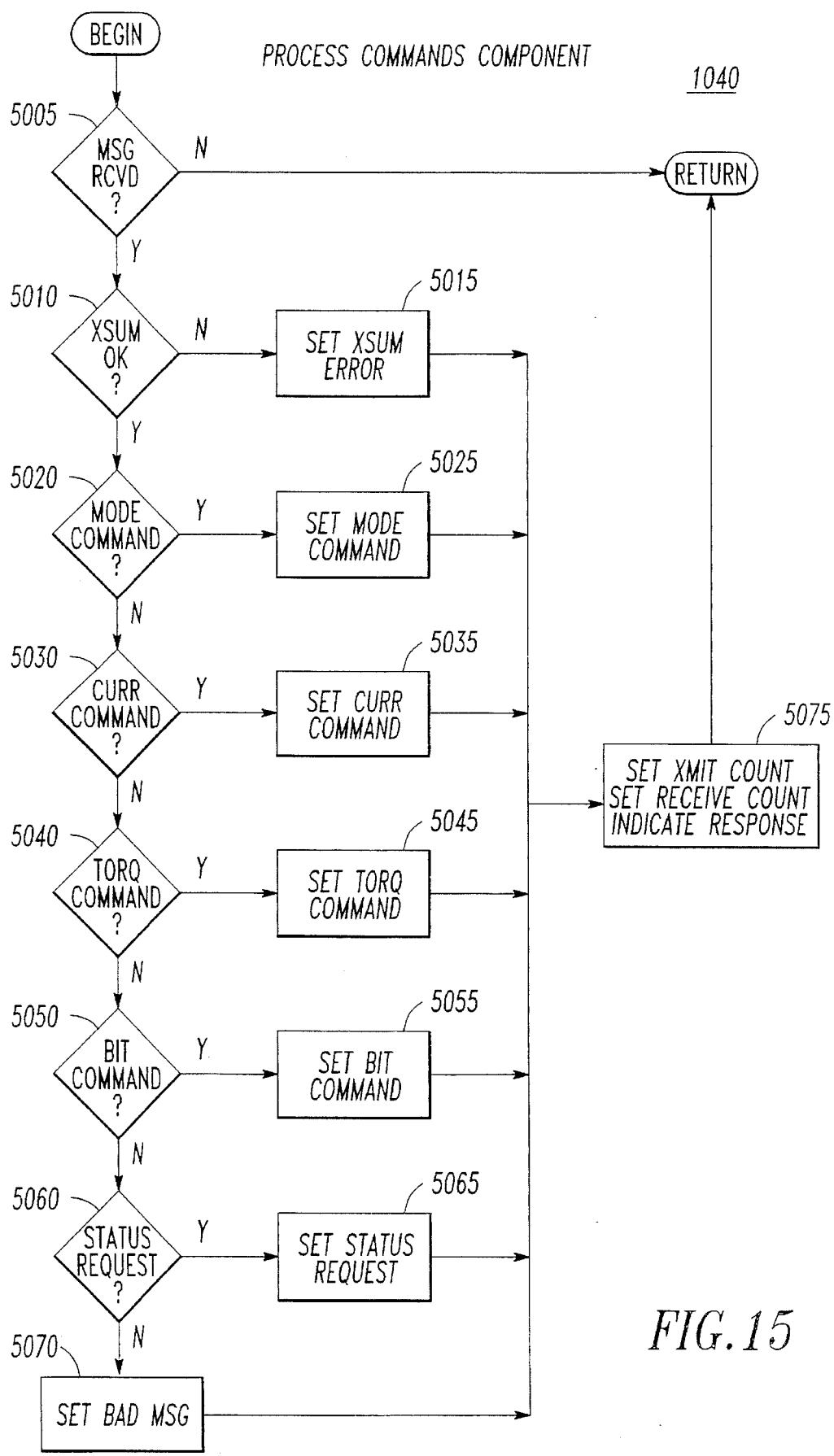
FIG. 15 is a flow chart illustrating the instructions of the process commands component of the motor controller software.

The instructions of the process commands component are illustrated in the steps of FIG. 15. Using instructions corresponding to step 5005, the microcontroller 100 determines whether it has received a message from the chassis controller 22. This determination is made by referring to both the receive counter and first byte of a command stored in the command que. The first byte of a command indicates the total number of bytes that make up the command. In step 5005, the microprocessor 100 determines whether the receive counter, which corresponds to the number of bytes stored in the command que, is equal to the number of bytes for the particular command indicated by the first byte of the command. For example, mode commands consist of a first byte that indicates that the command consists of three bytes. Thus, when the microcontroller 100 receives a mode command, it determines whether the receive counter is equal to three (step 5005).

If the receive counter is not equal to the number of bytes for the particular command indicated by the first byte of the command (step 5005), then the microcontroller 100 simply returns in this case to execute instructions for the step 4070 of the process control component 1030. Otherwise, the microcontroller 100 has received a complete command from the chassis controller 22 and the microcontroller 100 determines whether the checksum ("xsum") is okay (step 5010). All of the bytes of a command must add up to zero. The checksum makes sure that this is the case. For example, if the first two bytes of a three byte mode command add up to two (2), then the checksum for the command must be negative two (−2). Thus, in step 5010, the microprocessor 100 determines whether all of the bytes of the command add up to zero. If the bytes do not equal zero (step 5010), then there is a problem with the command received from the chassis controller 22 and the microcontroller sets a flag for the checksum to indicate the error (step 5015). Then, in step 5075, the microcontroller 100 sets the transmit (xmit) counter equal to the number of bytes of data to be sent back to the chassis controller 22. It also sets the receive counter to zero because it has nothing left to process. The command queue is empty. Finally, it generates a transmit interrupt which, as explained above, initiates a response to be sent to the chassis controller 22.

For example, if the xsum is not okay (step 5010) and the xsum error flag is set, then the transmit counter is set to four (indicating that four bytes are to be sent to the chassis controller 22), the first byte merely echoes back the first byte received from the chassis controller 22, the second byte is a status, the third byte is a checksum (that the chassis controller uses in a manner similar to the way the microcontroller 100 uses the xsum), and the fourth byte indicates whether the microcontroller 100 acknowledged (that is, executed some operation in response to a command).

If, however, the xsum is okay (step 5010), then the microprocessor 100 continues to identify the command received from the chassis controller 22 (steps 5020–5060). If the command received from the chassis controller 22 is not one of a mode command (step 5020), current command (step 5030), torque command (step 5040), BIT command (step 5050), or status request command (step 5060), then the microcontroller 100 sets a bad message flag that indicates that the command is one that cannot be processed (step 5070). It then continues in step 5075 and sets the transmit (xmit) counter equal to the number of bytes of data to be sent back to the chassis controller 22. It also sets the receive counter to zero because it has nothing left to process. Finally, it generates a transmit interrupt which, as explained above, initiates a response to be sent to the chassis controller 22.

In step 5020, the microcontroller 100 determines whether the command from the chassis controller 22 is a mode command. In this case, the command is for the microcontroller 100 to change its operating mode (or state). If yes, then the microcontroller 100 sets a mode command flag to reflect the mode command from the chassis controller 22 (step 5025). For example, if the current mode of the microcontroller 100 is the neutral mode 9005 and the microcontroller 100 receives a drive mode command from the chassis controller 22, then the microcontroller 100 sets its mode command flag to the drive mode. (Thus, during execution of the mode processing component 1070, the microcontroller 100 transitions into the drive mode (see drive mode 9085 of FIG. 21).)

On the other hand, if the command from the chassis controller 22 is a current command (step 5030), then the microcontroller 100 sets a current command flag to reflect the current command from the chassis controller 22 (step 5035). The microcontroller 100 uses this flag to indicate, while in the charge mode (discussed below), that it received a command to drive the battery charger 16.

If the command from the chassis controller 22 is a torque command (step 5040), then the microcontroller 100 sets a torque command flag to reflect the torque command from the chassis controller 22 (step 5045). The microcontroller 100 uses this flag to indicate, while in the drive mode (discussed below), that it will need to write out information for the DSP 200 to drive the motor 28.

If the command from the chassis controller 22 is a BIT command (step 5050), then the microcontroller 100 sets a BIT command flag to reflect the BIT command from the chassis controller 22 (step 5055). The microcontroller 100 uses this flag to indicate, while in the BIT mode (discussed below), that it received a command to execute one of various built-in-tests.

Finally, if the command from the chassis controller 22 is a status request command (step 5060), then the microcontroller 100 sets a status request command flag to reflect the status request command from the chassis controller 22 (step 5065). The microcontroller 100 uses this flag to indicate that it received a command to return requested status information to the chassis controller 22. For example, the chassis controller 22 might send a status request command asking the microcontroller 100 to indicate its current operating mode, i.e., neutral or drive.

After either one of steps 5015, 5025, 5035, 5045, 5055, or 5065, the microcontroller 100 sets the transmit (xmit)

counter equal to the number of bytes of data to be sent back to the chassis controller 22. It also sets the receive counter to zero because it has nothing left to process. Finally, it generates a transmit interrupt which, as explained above, initiates a response to be sent to the chassis controller 22.

5. A/D INPUTS COMPONENT

Figure 16:
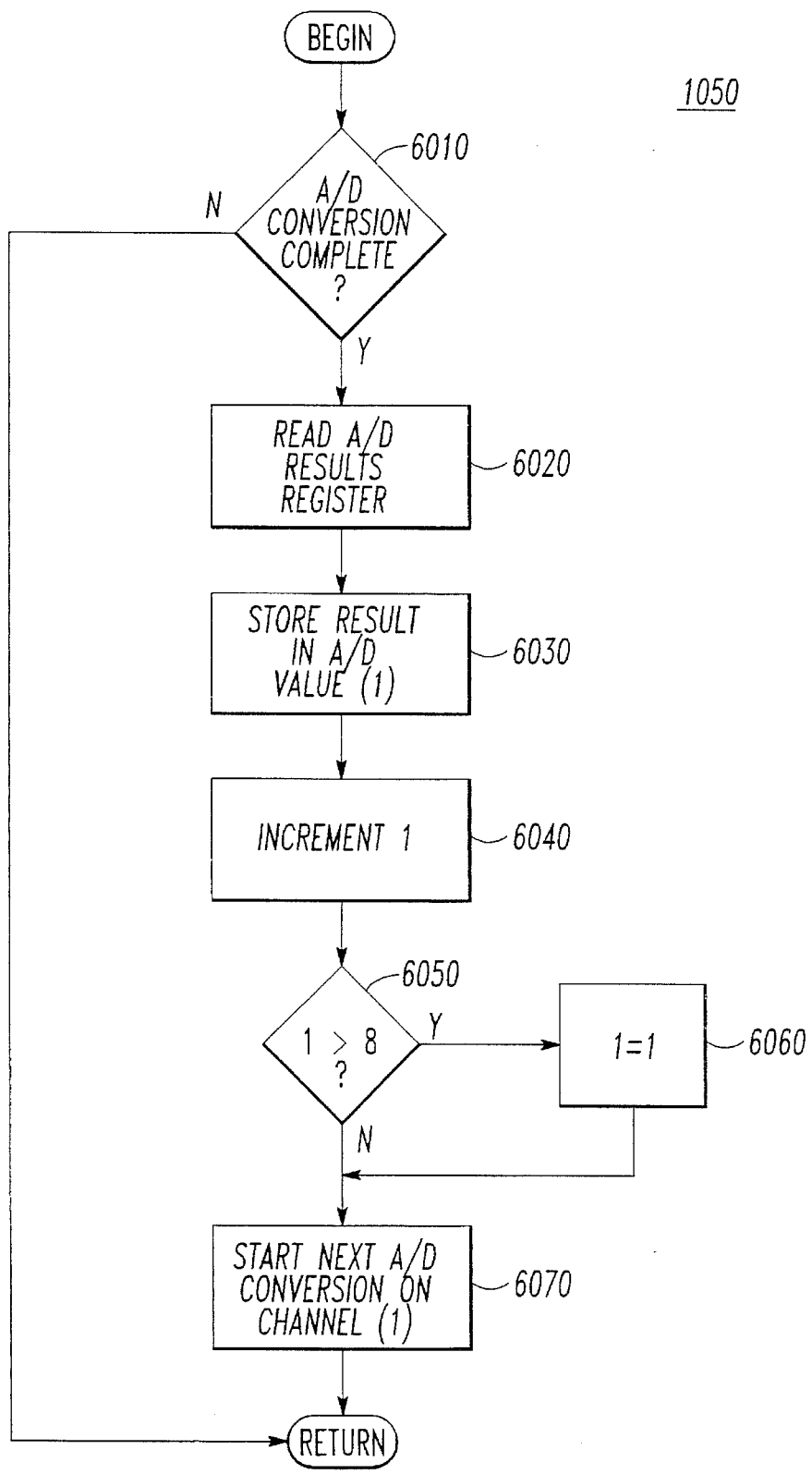
FIG. 16 is a flow chart illustrating the instructions of the A/D (analog-to-digital) inputs component of the motor controller software.

The instructions of the A/D inputs component 1050 will now be explained with reference to the steps illustrated in FIG. 16. As explained above, the microcontroller 100 receives digital values for a number of analog inputs used during its various mode processing. Each analog input is from a separate analog channel connected to the A/D converter 110. The A/D converter 110 converts the analog input on each channel one at a time and stores the digital value in a special results register of the microcontroller 100.

For example, the microcontroller 100 receives a digital value for an analog input from the temperature sensor 104 indicating the temperature (−10 degrees to +105 degrees centigrade) of the cold plate 14 and first and second power bridges 48 and 50. Other analog inputs include a reference signal (5 volts), battery voltage (0–500 volts), battery voltage (300–500), voltage on controller (0–500 volts), ground (0 volts), and two spares.

Since each analog input (for all eight channels) is converted into an eight bit digital value, the A/D input component 1050 primarily consists of a loop of instructions used to store a digital value for each analog input from each channel. The digital values for converted analog inputs (all eight channels) are stored in an array of the digital values (Value [I]).

First, in step 6010, the microcontroller 100 determines whether A/D conversion is complete. In other words, a digital bit has been converted from an input analog signal. If yes then the microcontroller 100 reads the A/D results register, that is, a register in the microcontroller 100 where the A/D converter 110 stores results of A/D conversion (step 6020). It then stores a digital value from the A/D results register in the Value array at location I (step 6030). The microcontroller 100 then increments I by one (step 6040) and determines whether I is greater than 8, which means that all eight bits for an analog input (for all eight channels) has been stored in the Value array (step 6050). If yes (step 6050), then the microcontroller 100 sets I equal to one (step 6050). Otherwise, or after step 6050, the microcontroller 100 signals the A/D converter 110 to start converting the next analog input on Channel[I].

If all eight channel inputs have been converted and stored in the Value array (step 6050), then the microcontroller resets I equal to one and begins to signal the A/D converter 110 to begin converting all eight channels for analog inputs beginning with the first channel, reads the converted digital values, and stores the values in the Value array (step 6070 after step 6060). If all eight have not yet been converted and stored in the Value array (step 6050), then the microcontroller 100 signals the A/D converter 110 to convert the next analog input on Channel[I] (step 6070 after step 6050). In other words, the analog input from Channel[I] is converted by the A/D converter 110 and later stored in step 6030 as Value[I].

6. FAULT LOGGING COMPONENT

Figure 14:
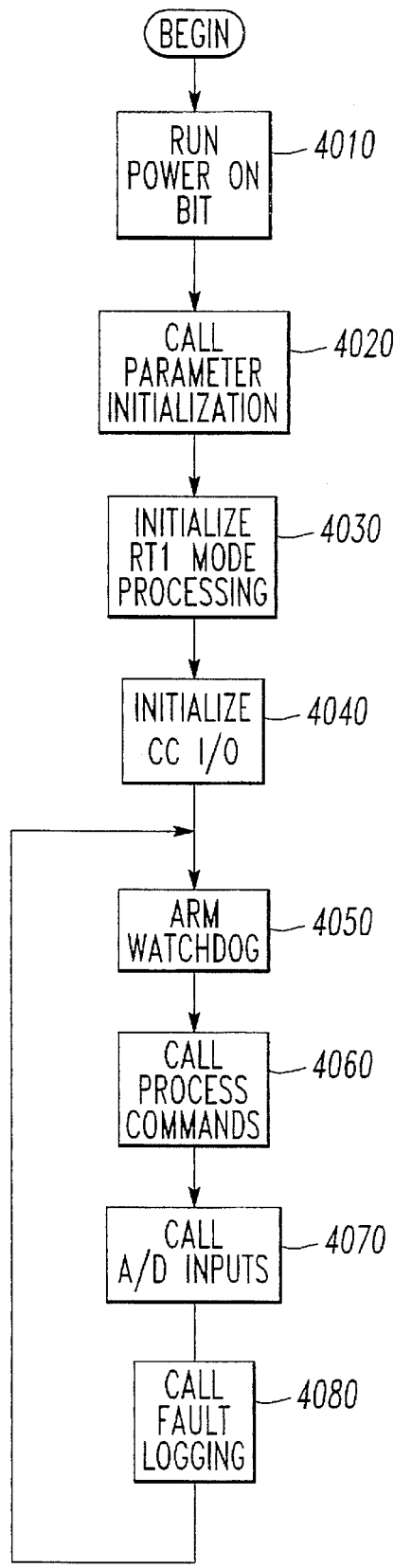
FIG. 14 is a flow chart illustrating the instructions of the process control component of the motor controller software.
Figure 17:
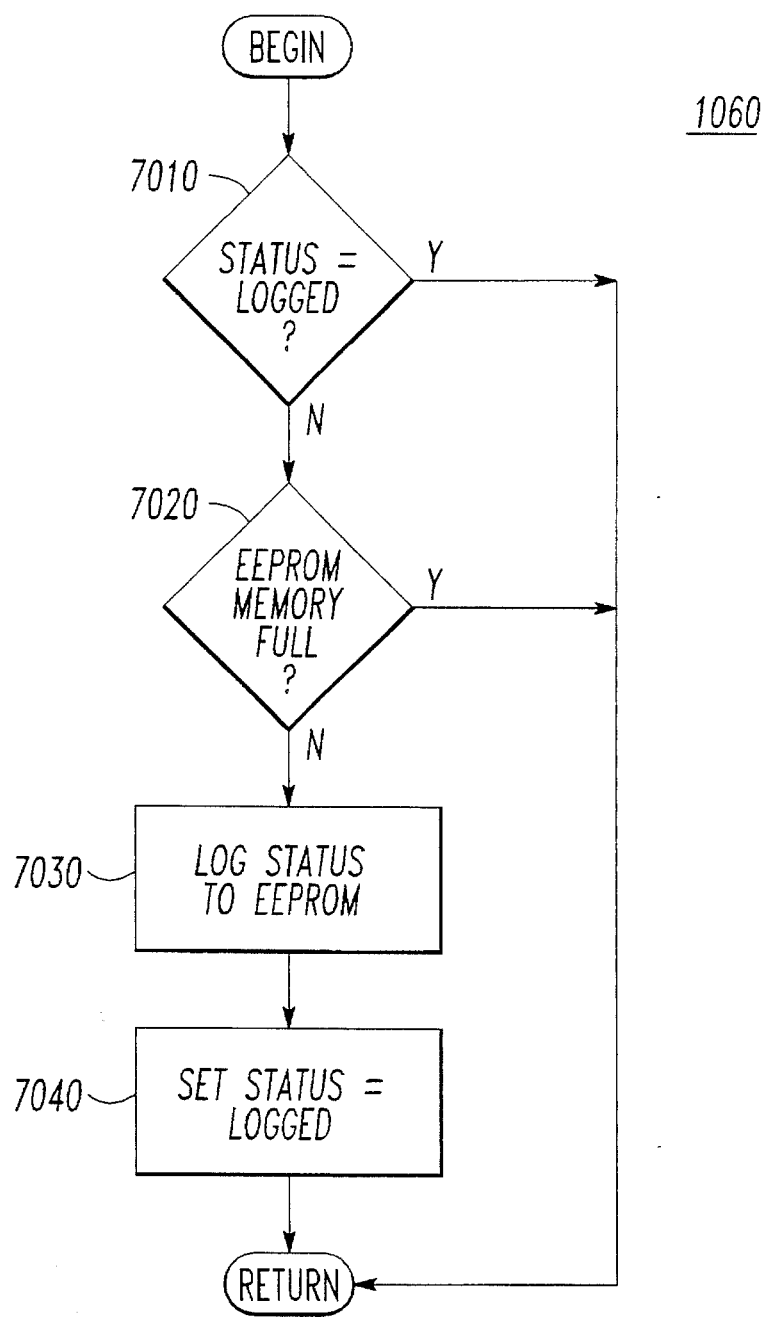
FIG. 17 is a flow chart illustrating the instructions of the fault logging component of the motor controller software.

The instructions of the fault logging component 1060 will now be explained with reference to the steps illustrated in FIG. 17. Again, the instructions of the fault logging component 1060 would be executed by the microcontroller 100 at step 4080 (FIG. 14). In general, using the instructions of the fault logging component 1060, the microcontroller 100 simply stores errors that occur during operations. For example, whenever a status flag is set to indicate that an error occurred, the microcontroller 100 records the setting of the status flag.

In step 7010, the microcontroller 100 determines whether a status flag indicates "logged". This is so when an error has not occurred, in which case the microcontroller 100 simply continues processing with step 4050 (FIG. 14), having completed the loop 4050–4080 of the process control component 1030. Otherwise, the status flag does not equal "logged", indicating that an error has occurred during the microcontroller 100 processing. If so, the microcontroller 100 determines whether the EEPROM portion of the memory of the microcontroller 100 is full (step 7020). If yes, then the microcontroller 100 continues processing with step 4050 (FIG. 14). If not, then the microcontroller 100 stores data identifying the error (step 7030) and sets the status flag to indicate that it has logged an error. Then, the microcontroller 100 continues processing with step 4050 (FIG. 14).

7. MODE PROCESSING COMPONENT

Figure 18:
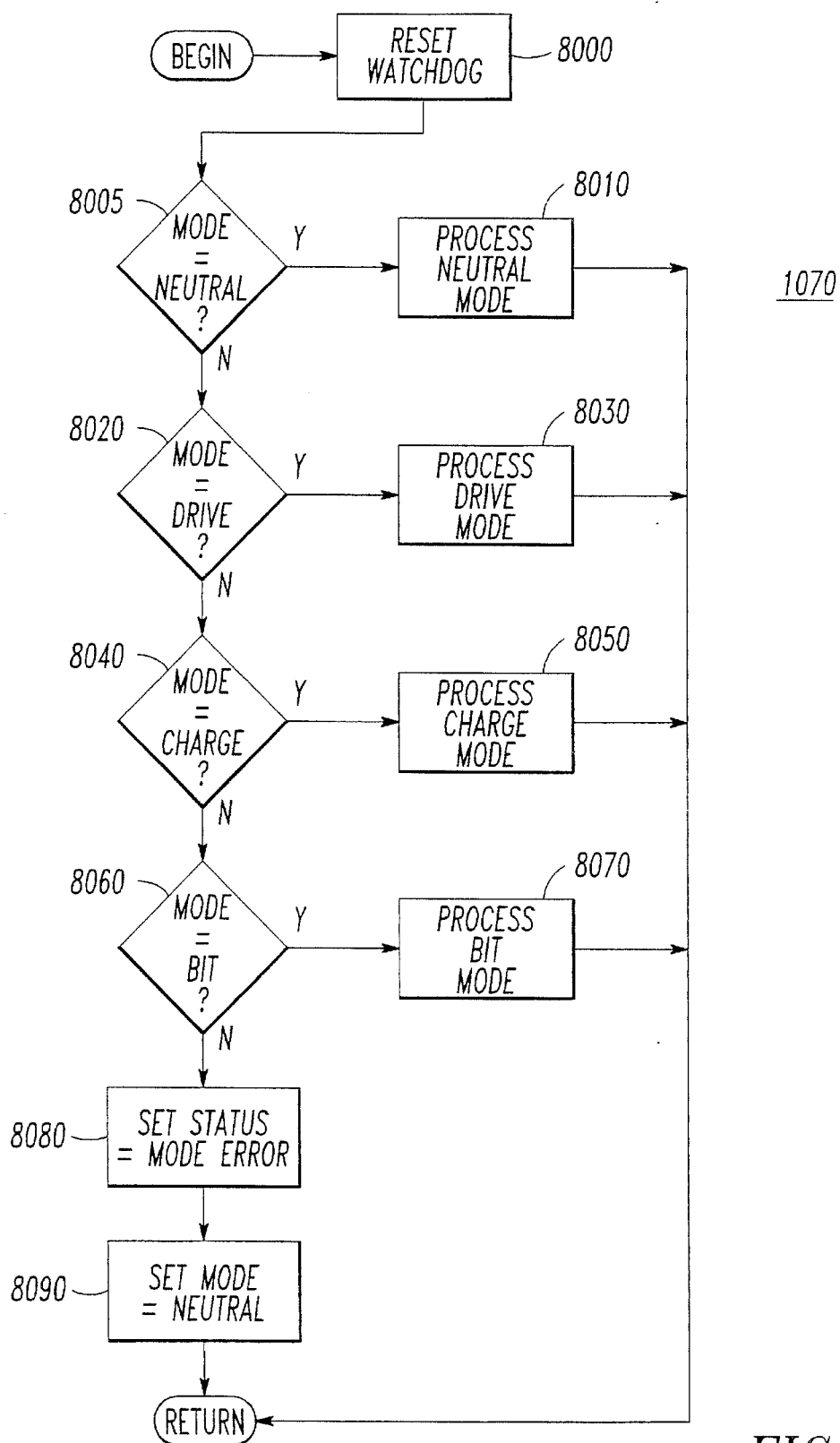
FIG. 18 is a flow chart illustrating the instructions of the mode processing component of the motor controller software.

The instructions of the mode processing component 1070 will now be explained with reference to the steps illustrated in FIG. 18. In general, while executing the instructions of the mode processing component 1070, the microcontroller 100 transitions between multiple operating modes (or states) including a neutral mode, drive mode, charge mode, and BIT mode. The processing for each of the modes as well as states of the microcontroller 100 for transitioning between modes will be explained below. The instructions of the mode processing component 1070 are executed by the microcontroller 100 when, using instructions of the process commands component 1040, it sets a mode command in step 5025 (FIG. 15).

The instructions of the mode processing component 1070 are interrupt driven, that is, every time the real time interrupt (see step 4030) indicates that 10 milliseconds have elapsed the microcontroller 100 interrupts processing instructions of any of the other components 1020, 1030, 1050, 1060, and 1080 to execute the instructions of the mode processing component 1070. When it completes execution of the mode processing components 1070 instructions, the microcontroller 100 returns to execute the instruction from the component at the point when it was interrupted. Of course 10 milliseconds later the reset time interrupt triggers again and the cycle repeats.

Mode change commands are used to tell the microcontroller 100 which mode to transition to. These commands are received from the chassis controller 100 in response to gear selector (PRNDL) position changes. The chassis controller 100 sends torque commands while in drive mode in response to accelerator and brake inputs. Current commands are sent while in charge mode to set the charge level to the battery. BIT test commands are sent in BIT mode to select the tests to be executed. Status request commands can be sent at any time to request the microcontroller 100 to return the selected status information. All communications between the chassis controller 22 and the microcontroller 100 are initiated by the chassis controller 22.

In step 8000, the microcontroller 100 resets the watchdog. So the watchdog is armed during execution of the loop (steps 4050–4080) of the process control component 1030 and reset in step 8000. If either of the arming of the watchdog (step 4050) or the resetting of the watchdog (step 8000) is not executed then the microcontroller 100 resets itself. In other words, after every arming (step 4050) the watchdog must be reset (step 8000). Otherwise, there is an error in processing in the microcontroller 100.

In steps 8005, 8020, 8040, and 8060, the microcontroller 100 identifies the type of mode specified in a mode change command received from the chassis controller 22. If the mode type in a mode change command is not a neutral mode, drive mode, charge mode, or BIT mode, then the microcontroller 100 sets the status flag (see steps 7010 to 7040 of FIG. 17) to reflect that it received a "mode error" or incorrect (or unrecognizable) mode command from the chassis controller 22 (step 8080).

As discussed above with reference to the discussion of the instructions of the fault logging component 1060, when the status flag does not equal "logged", then the microcontroller 100 stores the status in its memory. Thus, when the microcontroller 100 sets the status flag to "mode error" in step 8080 and then completes operations of the mode processing component 1070. Then, the fault logging component 1060 will log the "mode error" status.

The microcontroller 100 then sets itself in the neutral processing mode 9005 (see FIG. 19) (step 8090). In other words, when it receives an incorrect mode command (step 8080), the microcontroller sets mode equal to neutral mode 9005 so the next time the mode processing component 1070 is executed, the microcontroller 100 recognizes that the mode is neutral 9005 (step 8005) and processes commands from the chassis controller 22 accordingly (step 8010). This ensures that the chassis controller 22 sends another command to reset the microcontroller 100 in a correct mode before the microcontroller 100 processes, for example, another torque or other command from the chassis controller 22.

As discussed above, the first byte of a mode command from the chassis controller 22 specifies a requested mode type. For example, when the first byte of a command from the chassis controller 22 represents any one of the characters "A", "B", "C", or "D", then the command is a mode command, and the microcontroller sets the mode command flag to reflect this in step 5025 (FIG. 15). During execution of the instructions for the mode processing component 1070, the microcontroller 100 then identifies which of the modes was requested by the chassis controller 22. For example, when the first byte of a mode command is the character "A", it might mean the mode type is neutral; "B" might signal the drive mode; "C" might signal the charge mode; and "D" might signal the BIT mode.

If the mode command from the chassis controller 22 indicates the neutral mode 9005 (step 8000), then the microcontroller 100 executes the instructions for the neutral processing mode 9005 (step 8010). The instructions for the neutral processing mode 9005 will be explained below with reference to the state diagrams and related tables illustrated in FIGS. 19–22.

If the mode command from the chassis controller 22 is the drive mode 9085 (see FIG. 21) (step 8020), then the microcontroller 100 executes the instructions for the drive processing mode 9085 (step 8030). The instructions for the drive processing mode 9085 (or drive mode processing component 1080) will be explained below with reference to FIGS. 23–25. In general, the mode change to drive 9085 (forward and reverse) from neutral mode 9005 causes the microcontroller 100 to transition to drive mode 9085. In transitioning from neutral 9005 to drive 9085, battery voltage and cold plate temperature are first checked to see if they are within allowed ranges. High voltage power is applied to the electronics (if it is not already applied) by closing relays in proper sequence, and diagnostic statuses are checked to see if drive mode is allowed. In drive mode 9085, the chassis controller 22 sends torque commands ("TorCmd") in response to accelerator and brake inputs. The microcontroller 100 filters the commanded torque values and sends appropriate torque outputs to the DSP 200 (via the digital gate array 300) for use in controlling the pwm signals that drive the motor 28.

If the mode command from the chassis controller 22 indicates the charge mode 10800 (see FIG. 26) (step 8040), then the microcontroller 100 executes the instructions for the charge processing mode (step 8050). The instructions for the charge processing mode (or charge mode processing component 1090) will be explained below with reference to the state diagram illustrated in FIG. 26. In general, the mode change command causes the microcontroller 100 to transition to charge mode 10800. In transitioning to charge mode 10800, cold plate temperature is checked for valid charging temperature, the chassis fault detection circuit is checked for faults, and the charger BIT tests are run. If all conditions are met, the microcontroller 100 enters charge mode 10800. In charge mode 10800, the chassis controller 22 sends commands to set the level of charge to the battery 40.

Finally, if the mode command from the chassis controller indicates the BIT mode 10930 (see FIG. 27) (step 8060), then the microcontroller 100 executes the instructions for the BIT mode 10930 (step 8070). The instructions for the BIT mode 10930 (or BIT mode processing component 1100) will be explained below with reference to FIG. 29. In general, the mode change to BIT causes the microcontroller 100 to transition to BIT mode 10930. In transitioning from neutral 9005 to BIT 10930, high voltage is removed from various electronics of the system 10 by opening the supply relays and closing a discharge relay in the proper sequence. This is done as a precaution against possible injury to maintenance personnel. In BIT mode 10930, test commands indicate which tests to execute. The microcontroller 100 executes the requested test and returns the test status value. The status values can then be used to search through a fault tree to determine which test to run or where an operating failure occurred. If a chassis fault is detected, high voltage power is removed from various electronics by opening the supply relays and closing the discharge relay.

a. NEUTRAL PROCESSING MODE

The instructions for the neutral processing mode 9005 will now be explained with reference to the state diagrams and related tables illustrated in FIGS. 19–22.

Figure 19:
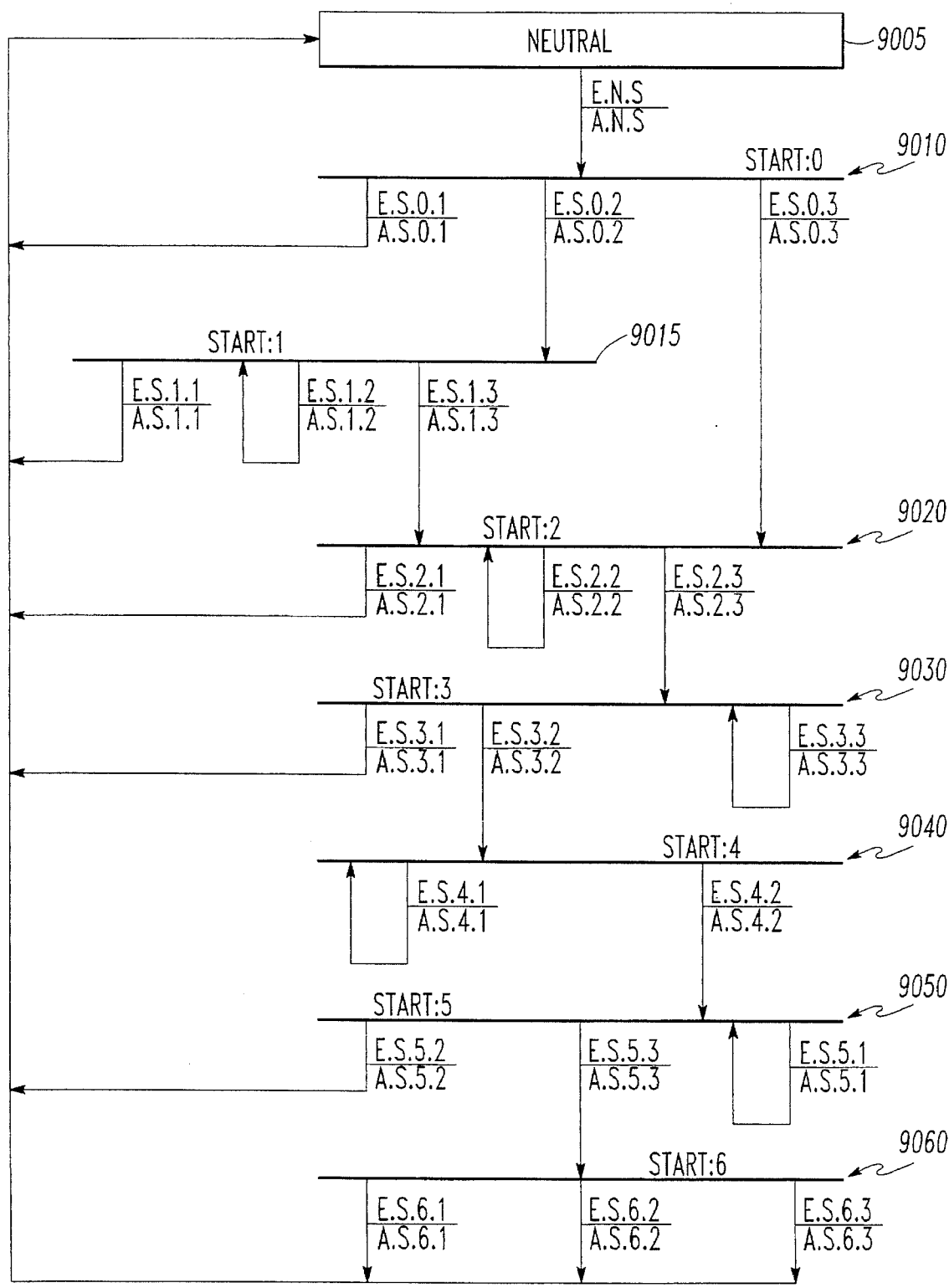
FIG. 19 is a state diagram illustrating the states and conditions (events and actions) of the microcontroller when transitioning between the neutral to start to neutral states.

FIG. 19 illustrates the states of the microcontroller 100 for processing a start command from the chassis controller (by transitioning between neutral mode 9005 and various start substates 9010 to 9060. FIG. 20 is a table listing the event codes (E.N.S. and E.S.#. #, where "#" is a number) and action codes (A.N.S. and A.S.#.#, where "#" is a number) specified in FIG. 19. In general, a start command causes the microcontroller 100 to execute diagnostic tests, including tests of various components on the vector control board 46. These tests require that high voltage power be applied to various electronics in the system 10. The microcontroller 100 first checks that battery voltage and cold plate temperature are within the proper ranges to run the tests, then applies voltage by closing relays in a timed sequence. The start command tests are run and the microcontroller 100 automatically returns to the neutral mode 9005. Test failures are logged in the memory of the microcontroller 100 and it also returns to neutral mode 9005.

In FIGS. 19 and 20, various timers are used to keep time of functions, including various test and other operations, of the microcontroller 100 as it transitions between the various "start" substates: START:0 9010, START:1 9015, START:2 9020, START:3 9030, START:4 9040, START:5 9050, and START:6 9060. When the microcontroller 100 receives a start command from the chassis controller 22 it begins in the neutral mode 9005 and then transitions among the substates. If the microcontroller 100 successfully processes a start command then it transitions through all of these "start" substates. After transitioning from neutral mode 9005 through all of these substates 9010 to 9060 and then back to neutral 9005, having successfully processed a start command, or if during any one of these "start" substates 9010 to 9060, a particular test is not successfully completed, then the microcontroller 100 returns to the neutral mode 9005. The microcontroller 100 keeps track of its current substate.

For example, if the microcontroller 100 is in the neutral mode 9005 and a start command is received (event code "E.N.S."), then the microcontroller 100 sets a mode variable equal to "START:0", transitioning to substate "START:0" 9010. In substate "START:0" the microcontroller 100 checks to see if specific conditions are appropriate to execute certain start tests for the vehicle propulsion system 10, including BIT tests, relay tests, tests of the charge capacitors. The microcontroller 100 checks the digital values for the analog input received during execution of the instructions for the A/D input component 1050.

Then, the microcontroller 100 closes the precharge relay, sets the current substate to "START:1", transitioning to substate "START:1" 9015 during which the microcontroller 100 executes a capacitor precharge test (E.S.0.2 and A.S.0.2). Details on the tests are specified in the table in FIG. 20. If it is determined that the capacitor precharge relay passed the test, then the microcontroller 100 sets the current substate equal to "START:2", transitioning to substate "START:2" 9020 (E.S.1.3 and A.S.1.3).

In substate "START:2" 9020 it determines whether the precharge relay passed a set of tests including whether the voltage is high enough to go to set the current substate equal to "START:3" 9030 (E.S.2.3 and A.S.2.3). In substate "START:3" the microcontroller 100 closes the main relay (A.S.3.3), which allows a little current to begin flowing from the battery 40 to the motor 28, and waits a predetermined amount of time before setting the current substate to "START:4", transitioning to substate "START:4" 9040 (E.S.3.2 and A.S.3.2). In transitioning from substate "START:4" 9040 to "START:5" 9050, the microcontroller 100 waits a predetermined amount of time and then begins testing the main relay to make sure, for example, that it was closed (E.S.4.2 and A.S.4.2).

Then in substate "START:5", the microcontroller 100 checks to see if the main relay is closed. This is determined by identifying whether there is a voltage drop across the main relay. If there is a drop then the main relay did not close and the microcontroller 100 returns to the neutral mode 9005 to await another start command from the chassis controller 22. Otherwise, the main relay closed (E.S.5.3), and the microcontroller 100 cancels the main relay test (having successfully completed the test), sets the status of the main relay test to "passed", sets a timer to zero and sets the current substate to "START:6" during which its runs various test of the IGBTs 54, 56, 58, and 60 (A.S.5.3). When the tests are successfully completed, the microcontroller 100 returns to the neutral mode 9005 (E.S.6.3 and A.S.6.3).

Figure 21:
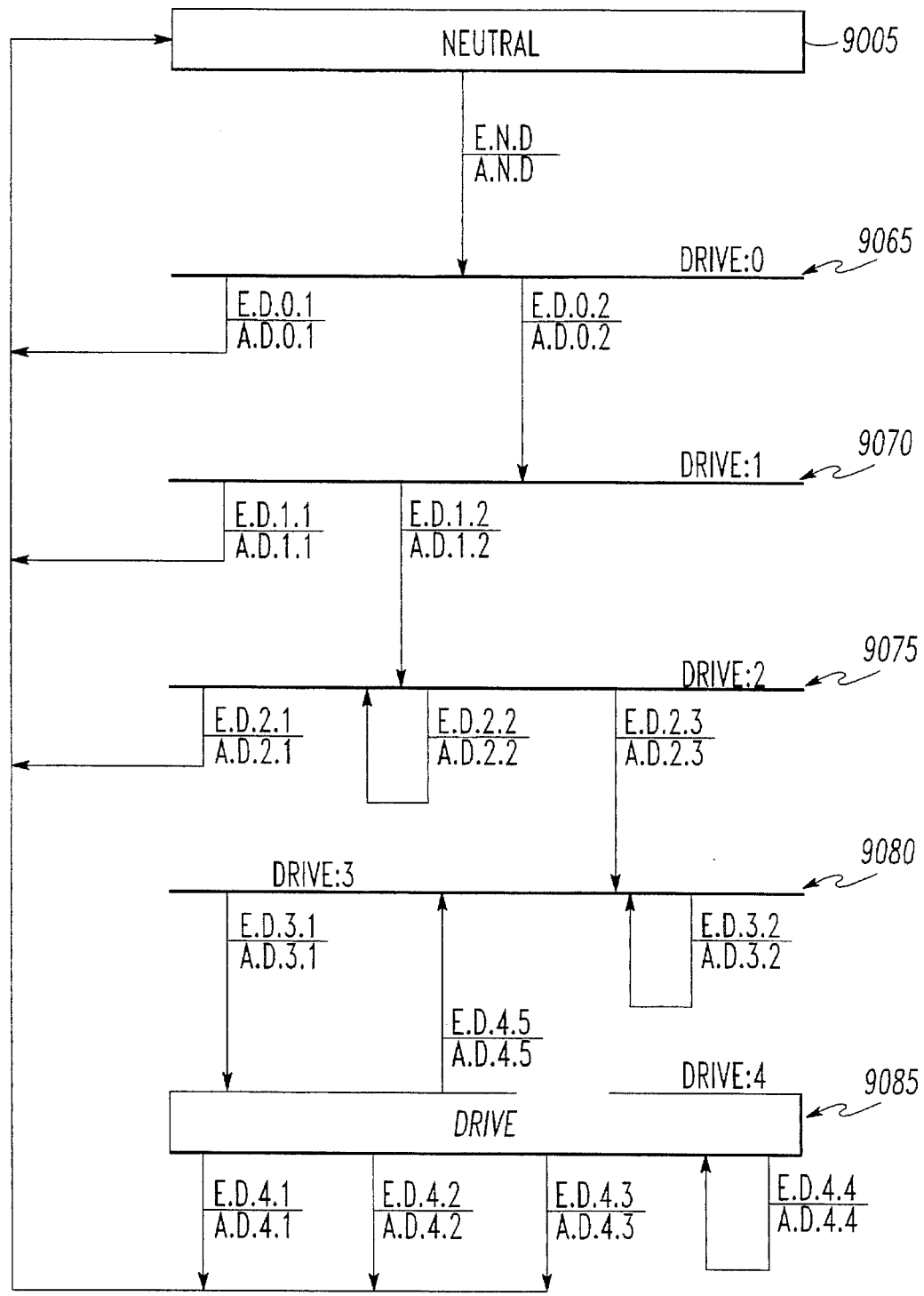
FIG. 21 is a state diagram illustrating the states and conditions (events and actions) of the microcontroller when transitioning between the neutral to drive to neutral states.

FIG. 21 illustrates the substates of the microcontroller 100 for processing a mode change command to change to drive mode 9085 from the chassis controller (by transitioning between neutral mode 9005 and various drive substates 9065–9080 before entering the drive mode 9085). FIG. 22 is a table listing the event codes (E.N.D and E.D.#.#, where "#" is a number) and action codes (A.N.D and A.D.#.#, where "#" is a number) specified in FIG. 21. Specifics of the microcontroller 100 processing during the drive mode 9085 are detailed below with reference to the discussion of the drive mode processing component 1080.

If the microcontroller 100 receives a mode change command to change to drive mode 9085 (E.N.D), as described above with reference to FIGS. 13, 14, 15, and 18, then the microcontroller 100 sets its current substate equal to "DRIVE:0" 9065, and begins a series of state transitions among various drive substates. Upon the satisfactory completion of conditions between all drive substates, "DRIVE:0" 9065, "DRIVE:1" 9070, "DRIVE:2" 9075, "DRIVE:3" 9080 the microcontroller 100 enters the drive mode (current substate="DRIVE:4" 9085).

For example, if the microcontroller 100 determines that voltage from the battery 40 is okay (or at a predetermined level), then the microcontroller 100 closes the precharge relay, sets a timer at zero, and sets its current substate equal to "DRIVE:1" 9070 (E.D.0.2 and A.D.0.2). In substate= "DRIVE:1" 9070, the microcontroller 100 executes a number of tests to see if the precharge relay is charging. If the precharge relay passed the tests of substate="DRIVE:1" 9070, then the microcontroller 100 indicates that the precharge relay passed its tests, sets a timer to zero, and sets the current substate of the microcontroller 100 to "DRIVE:2" 9075 (E.D.1.2, and A.D.1.2).

In substate ="DRIVE:2" 9075, the microcontroller 100 waits a predetermined amount of time and then closes the main relay, sets a timer to zero, and transitions to substate ="DRIVE:3" 9080 (E.D.2.3 and A.D.2.3). In substate= "DRIVE:3" 9080, the microcontroller 100 determines whether the main relay has been closed a predetermined amount of time in which case it enables the IGBTs 54 and 56, sets a DSP mode equal to drive, reset the timer, and sets the current substate to "DRIVE:4" 9085 (E.D.3.1 and A.D.3.1) or the current mode to be the drive mode 9085.

If the microcontroller 100 receives a mode change command to change to neutral mode 9005 then it returns to the neutral mode 9005 (E.D.4.1 and A.D.4.1). If it receives a mode change command for a mode other than neutral 9005 or drive 9085, then it returns to the neutral mode 9005 (E.D.4.2 and A.D.4.2). If it receives information indicating the DSP is not in drive mode then it returns to the neutral mode 9005 (E.D.4.3 and A.D.4.3). If it receives a drive mode change command then it resets the current mode to drive mode 9085 (E.D.4.4 and A.D.4.4).

8. DRIVE MODE PROCESSING COMPONENT

Figure 23:
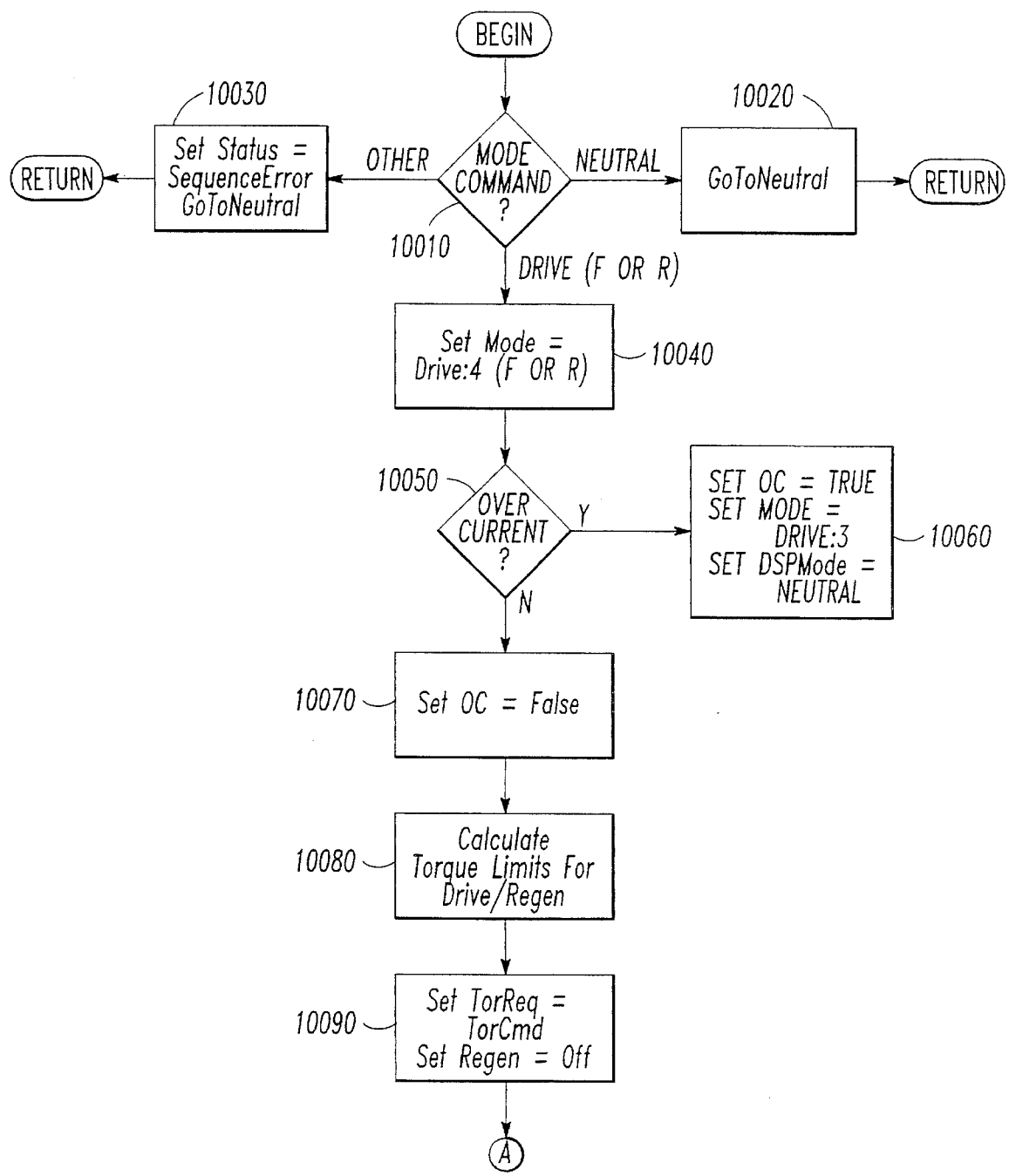
FIGS. 23–25 are flow charts illustrating the instructions of the drive mode processing component of the motor controller software.
Figure 24:
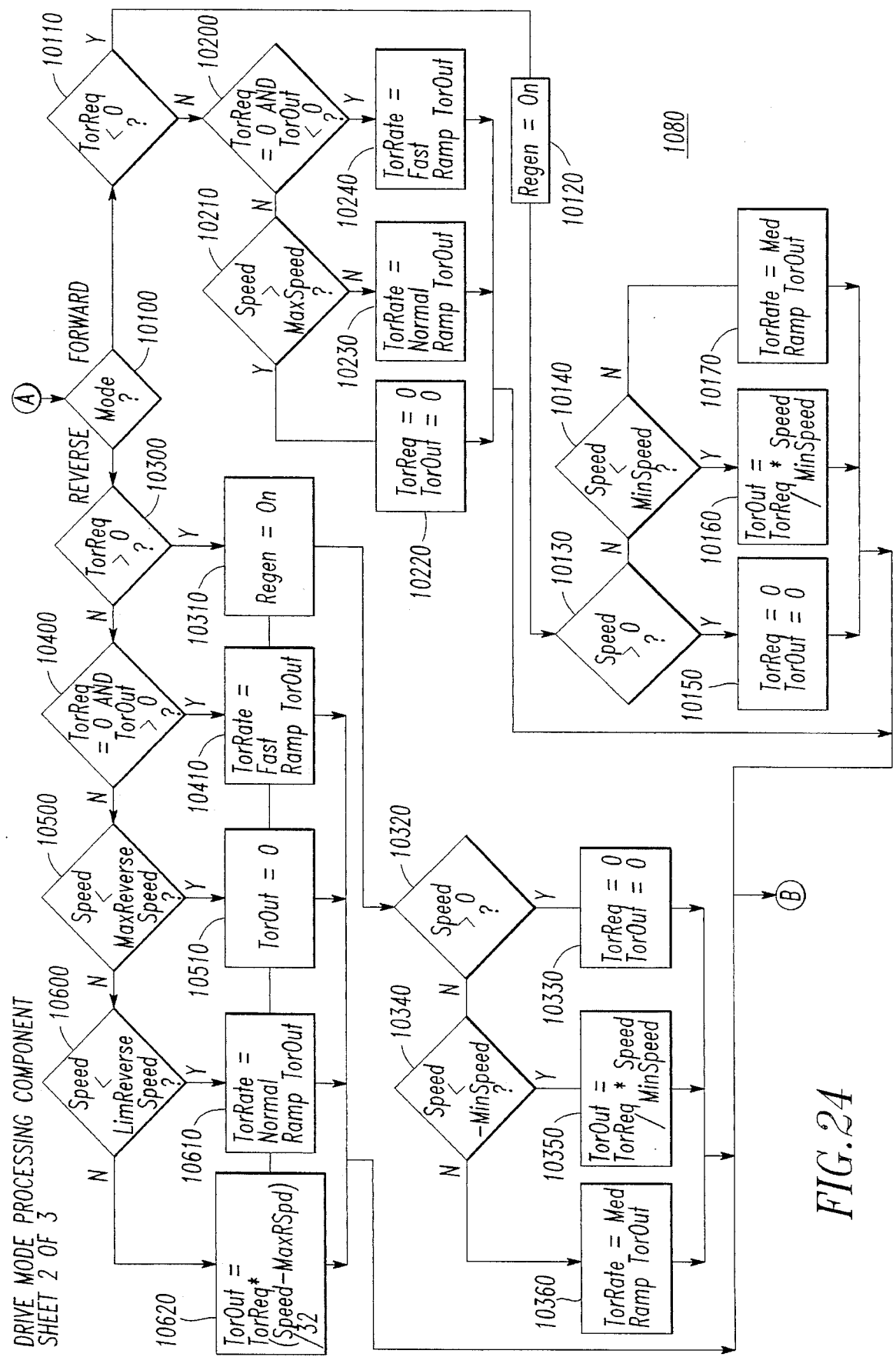

The instructions for the drive processing mode (or drive mode processing component 1080) will be explained below with reference to FIGS. 23–25.

In step 10010, the microcontroller 100 determines whether the chassis controller 22 sent a mode command. If it receives a mode command to change to the neutral mode 9005 (this corresponds to E.D.4.1 of FIG. 22) then it sets the current mode of the microcontroller 100 in the neutral mode 9005 (step 10020) (this corresponds to A.D.4.1 of FIG. 22). If it receives a mode command other than to change to the drive mode and neutral mode (this corresponds to E.D.4.2 of FIG. 22), then the microcontroller 100 sets a status flag to indicate that it received a mode command out of sequence or an improper mode command to change its current mode to one other than the drive and neutral modes, and sets its current mode to neutral 9005 (step 10030) (this corresponds to A.D.4.2 of FIG. 22). After steps 10020 or 10030, the processing of the drive mode processing component 1080 is complete.

If, however, the microcontroller 100 receives a drive mode command from the chassis controller 22 to perform the instructions of the drive mode processing component 1080 (step 10010) (this corresponds to E.D.4.4 of FIG. 22), then the microcontroller 100 performs the instructions outlined in FIGS. 21 and 22 (A.D. 4.4) to set its current mode to the drive mode (step 10040), during which it processes torque commands from the chassis controller 22.

In step 10050, the microcontroller 100 determines whether there is too much current going to the motor 28. The microcontroller 100 performs this step by referring to the appropriate digital input from the digital gate array (OC) for overcurrent sensor 510 in the analog interface 500. If yes (step 10050) (this corresponds to E.D.4.5 in FIG. 22), then the microcontroller 100 sets an overcharge (OC) flag equal to true, sets its current substate at "DRIVE:3" and sets the DSP mode in neutral (step 10060) (this corresponds to A.D.4.5 of FIG. 22). Otherwise, the microcontroller 100 sets the OC flag equal to false (step 10070) and calculates the torque limits (step 10080). The microcontroller 100 calculates the torque limits using a current motor 28 speed that it receives from the DSP 200 as well as temperate and voltage values that were converted analog inputs from the A/D converter 110. In other words, the microcontroller 100 makes sure that torque commands (TorCmd) from the chassis controller 22 are within these torque limits. It then sets a variable "TorReq" equal to the torque value of a torque command from the chassis controller 22 and sets a flag for regenerative braking ("Regen") off (step 10090). The flow of the drive mode processing component continues in step 10100 of FIG. 24.

In step 10100, the microcontroller 100 determines whether the drive mode command from the chassis controller 22 (E.D.4.4 of FIG. 22) indicates forward or reverse. If forward (step 10100), then the microcontroller 100 determines whether TorReq (torque value of a torque command from the chassis controller 22) is less than zero (or negative) (step 10110). If yes, then the microcontroller 100 sets the Regen flag on (step 10120). This indicates that the microcontroller 100 will process the torque command from the chassis controller 22 as a request for regenerative braking. That is, where power from the motor 28 is used to charge the battery 40.

After setting Regen on (step 10120), the microcontroller 100 determines whether the speed (variable "Speed") from the DSP (see step 10080) is less than or equal to zero (step 10130). If yes, then the microcontroller 100 sets the TorOut variable to zero and the TorReq variable also to zero. The TorOut variable represents the value set in the digital gate array 300 and used by the DSP to drive the IGBTs 54 and 56.

If the Speed is greater than zero (step 10130) and the Speed is less than a predetermined minimum speed value (or "MinSpeed") (step 10140), then the microcontroller 100 sets the TorOut variable equal to the product of the TorReq value and the speed value divided by the minimum speed value (step 10160). For example, if the TorReq is 55, the speed from the DSP is 55, and the MinSpeed is 55, then the microcontroller 100 sets TorOut equal to 55. Otherwise, if the Speed is greater than or equal to the MinSpeed (step 10140), then the microcontroller 100 sets the variable TorRate equal to medium and ramps the TorOut (step 10170). There are three possible TorRates: slow, medium, and fast. The TorRate is used to specify how fast the torque should change.

Figure 25:
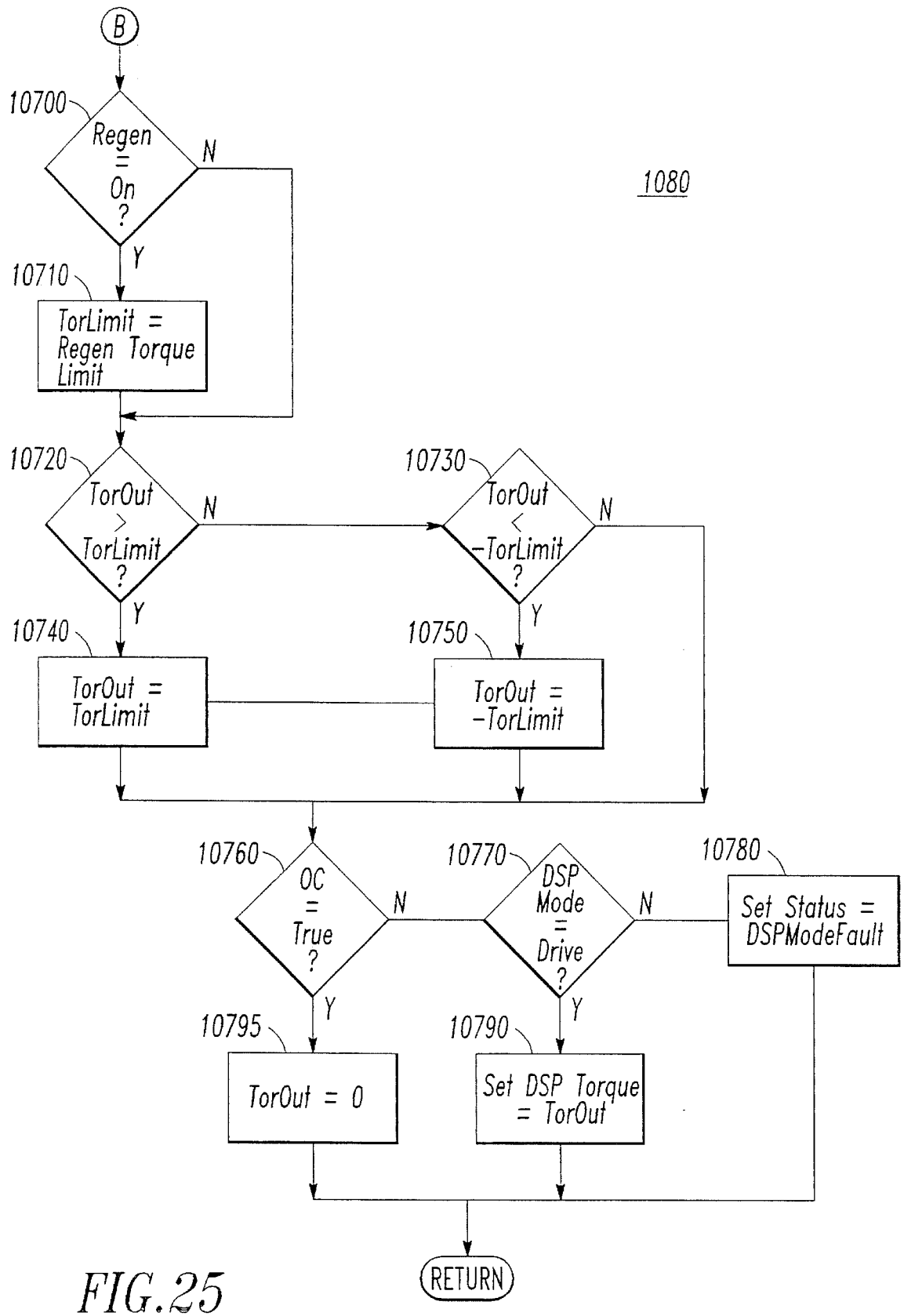

After executing the instructions represented by either of steps 10150, 10160, or 10170, the microcontroller 100 continues with step 10700 of FIG. 25.

If the microcontroller 100 determines that the drive mode is reverse (step 10100), then it determines whether TorReq is greater than zero (step 10300). If yes, then microcontroller 100 sets Regen to on (step 10310) and determines whether the Speed is greater than zero (step 10320). If yes, then the microcontroller performs instructions represented by step 10330. These instructions are the same as the instruction represented by step 10150 described above. Otherwise, if the Speed is less than or equal to zero (step 10320), then the microcontroller 100 determines whether the Speed is less than the negative value of the predetermined MinSpeed (step 10340). If yes, then the microcontroller 100 executes instructions corresponding to step 10350, which are the same as the instructions described above for step 10160. Otherwise, the microcontroller 100 executes instructions for step 10360, which are the same as the instruction for step 10170 described above.

If, however, the TorReq is less than or equal to zero (step 10300) and the TorReq is equal to zero and the TorOut is greater than zero (step 10400), then the microcontroller 100 sets the TorRate equal to fast and ramps the TorOut (step 10410). If the TorReq is not equal to zero or the TorOut is not greater than zero (step 10400) and Speed is less than MaxReverseSpeed (which is a maximum (e.g., 20) reverse speed for the vehicle propulsion system 10) (step 10500), then the microcontroller 100 sets TorOut equal to zero. Otherwise, when the Speed is less than the LimReverseSpeed (which is a predetermined value (e.g., 15) close the MaxReverseSpeed) (step 10600) then the microcontroller 100 sets the TorRate equal to normal and ramps the TorOut (step 10610). If not, then the microcontroller 100 sets TorOut equal to the product of the TorReq and Speed multiplied by MaxReverseSpeed divided by 32 (step 10620). This ensures that in this case the microcontroller 100 only gives a percentage of the torque requested.

After executing instructions for steps 10330, 10350, 10360, 10410, 10510, 10610, and 10620, the microcontroller 100 continues with instructions for step 10700 of the drive mode processing component 1080 (FIG. 15).

In step 10700, the microcontroller 100 determines whether the Regen flag indicates that regenerative braking is on. If yes then the microcontroller 100 sets the TorLimit equal to a predetermined regenerative braking torque limit (Regen Torque Limit) (step 10710). Otherwise, it skips step 10710.

The microcontroller 100 then determines whether the TorOut is greater than TorLimit (step 10720). If yes, then the microcontroller 100 sets TorOut equal to the TorLimit (step 10740). Otherwise, it determines whether the TorOut is less than the negative value of the TorLimit (step 10730). If yes, then it sets TorOut equal to the negative value of the TorLimit (step 10750). If not, then it skips step 10750.

After step 10740, 10750, or if the TorOut is not greater than TorLimit and TorOut is not less than the negative TorLimit, then the microcontroller 100 determines in step 10760 whether the overcharge or OC flag is true. If yes, then the microcontroller 100 sets the TorOut equal to zero (step 10795). If not, then the microcontroller 100 determines whether the DSP mode is drive (step 10770). If yes, then the microcontroller 100 sets the DSP Torque equal to TorOut (step 10790). If no, then it sets the status flag to indicate a DSP mode fault error (step 10780). After steps 10795, 10790, or 10780, the processing of the drive mode processing component 1080 is complete.

9. CHARGE MODE PROCESSING COMPONENT

Figure 26:
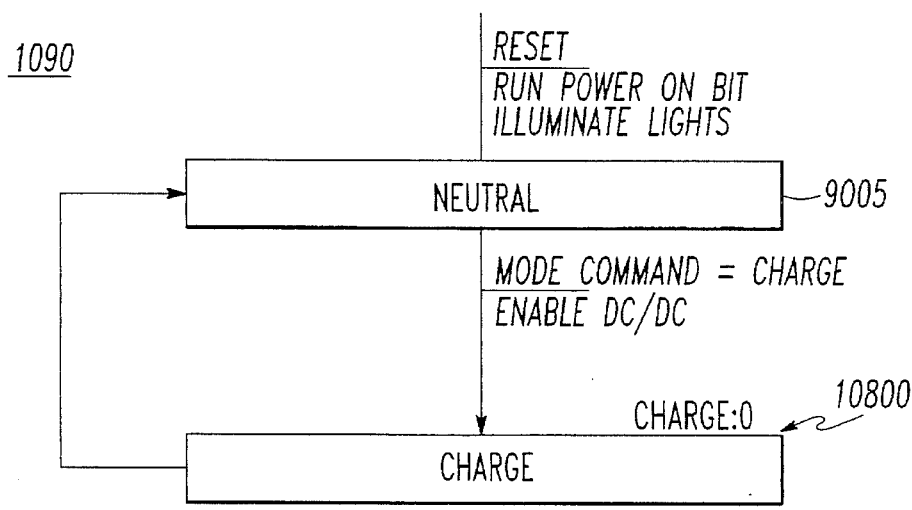
FIG. 26 is a state diagram illustrating the states and conditions (events and actions) of the microcontroller when transitioning between the neutral to charge to neutral states.

The instructions for the charge processing mode (or charge mode processing component 1090) will be explained below with reference to the state diagram illustrated in FIG. 26. In general, during charge mode processing, the microcontroller 100 monitors a chassis fault detector to determine if a chassis fault (e.g., one of the terminals to the battery is shorted) and sends current commands from the chassis controller 22 (steps 5050, 5035, and 5075 of FIG. 15 and instructions of the chassis controller I/O component) to the battery charger 16 to charge the battery 40.

From the neutral mode 9005, when the chassis controller 22 sends a charge mode command to the microcontroller 100 the microcontroller 100 enables the DC/DC converter 38 and enters the charge mode 10800 during which it sends current commands to the digital gate array 300 that sends pwm signals to the battery charger 16 that charges the battery 40. When charging is complete, or otherwise interrupted, the microcontroller 100 returns to the neutral mode 9005.

10. BIT PROCESSING COMPONENT

The instructions for the BIT processing mode (or BIT mode processing component 1100) will be explained below with reference to FIGS. 27–29.

Figure 27:
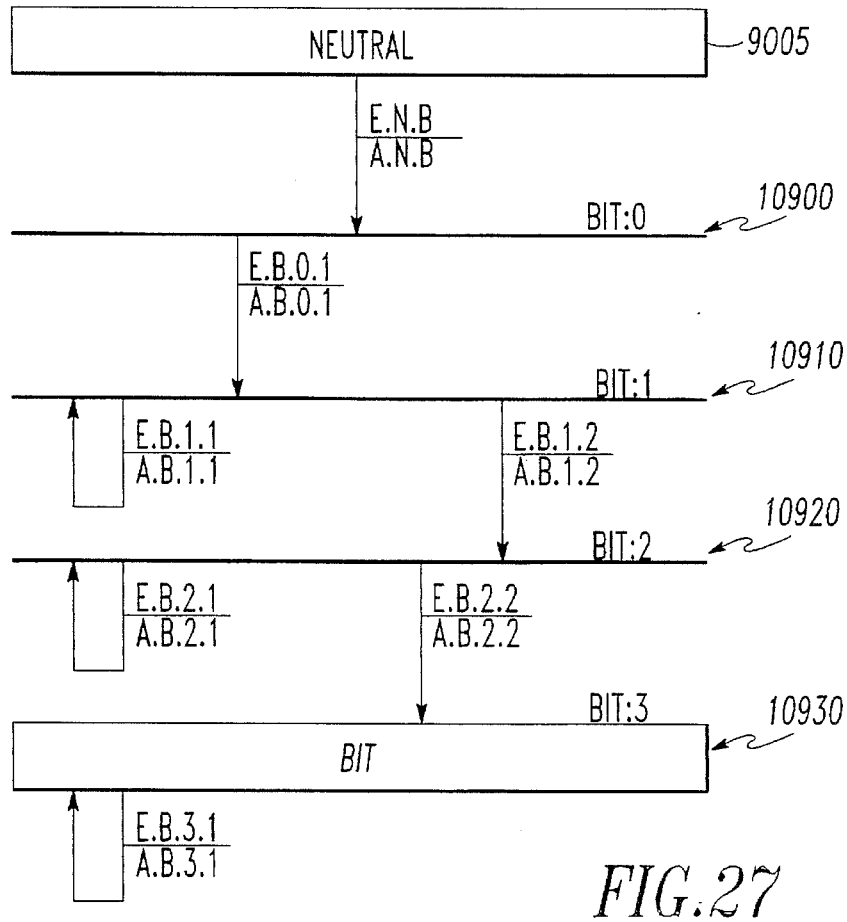
FIG. 27 is a state diagram illustrating the states and conditions (events and actions) of the microcontroller when transitioning between the neutral to BIT states.

FIG. 27 is a state diagram illustrating the microcontroller 100 state transitions between neutral mode 9005 and bit mode 10930. FIG. 28 is a table including the event codes and action codes for the state diagram in FIG. 27.

If the chassis controller 22 sends a BIT command to the microcontroller 100 (E.N.B), then the microcontroller 100 transitions to substate "BIT:0" 10900 (A.N.B). After a predetermined time (set by a real time interrupt) (E.B.0.1), the microcontroller 100 opens the main relay, sets a timer at zero, and transitions to substate "BIT:1" 10910 (A.B.0.1). In substate "BIT:1" 10910, the microcontroller 100 waits for the main relay to close. When the timer is incremented (A.B.1.1) until it is greater than a predetermined main relay bounce time (E.B.1.2), then the microcontroller 100 closes the discharge relay, sets the timer at zero, and transitions to substate "BIT:2" 10920 (A.B.1.2). In substate "BIT:2" 10920, the microcontroller 100 waits for the voltage on the main relay to decay to zero. When the timer is incremented (A.B.2.1) until a predetermined time when the voltage on the main relay is discharged (E.B.2.2), then the microcontroller 100 transitions into the substate "BIT:3" or the bit mode 10930 (A.B.2.2). In the bit mode 10930, the microcontroller opens the main relay, closes the discharge relay, and sets the status to reflect a chassis fault that requires a system 10 reset to exit from the bit mode 10930.

Figure 29:
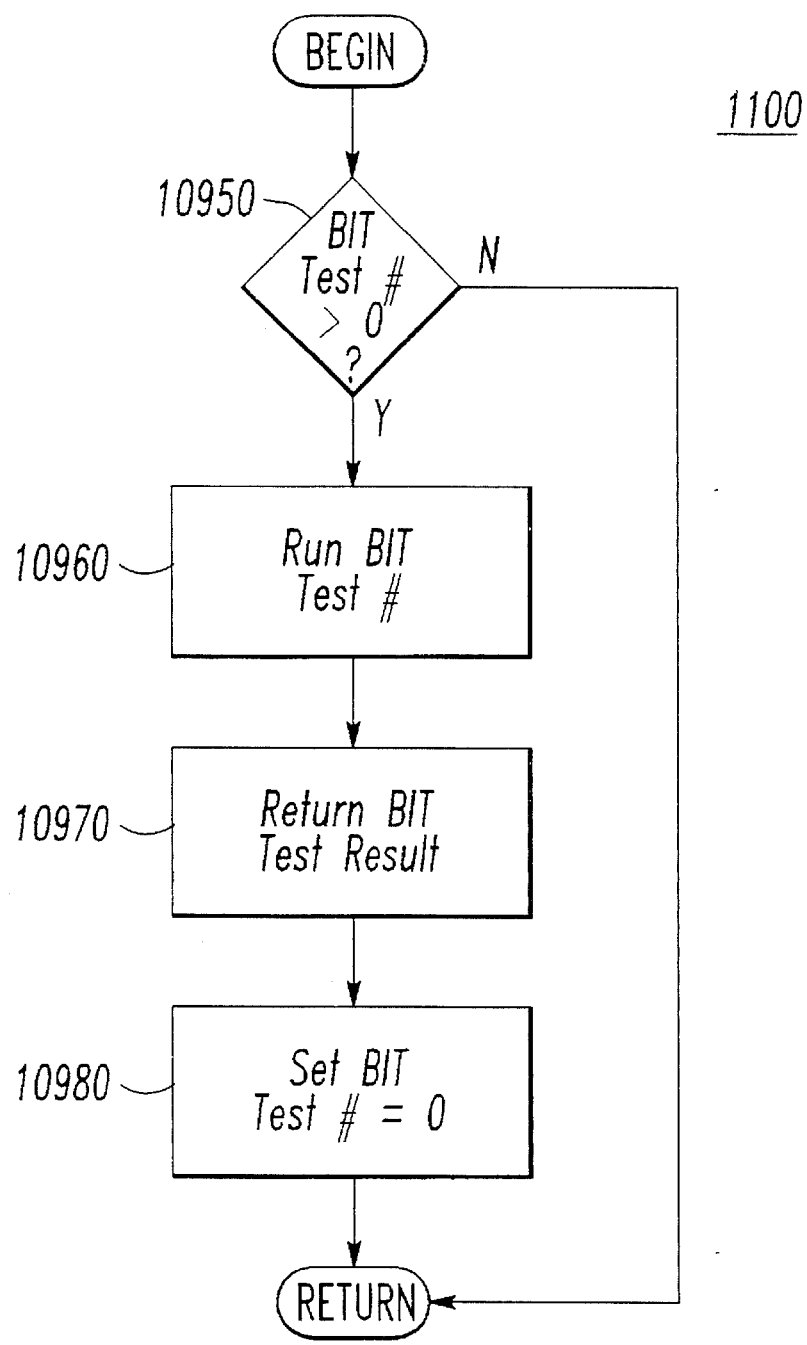
FIG. 29 is a flow chart illustrating the instructions of the drive mode processing component of the motor controller software.

While in bit mode 10930, the microcontroller 100 handles various BIT mode tests in accordance with instructions outlined in the steps of the BIT mode processing component 1100 specified in FIG. 29. When the chassis controller 22 sends the microcontroller 100 a BIT test command, then the microcontroller 100 determines which BIT test was requested, runs the test, and returns a test result.

First in step 10950, the microcontroller 100 determines whether the number of the BIT test requested by the chassis controller 22 is greater than zero. If not, then the microcontroller 100 simply does nothing with the BIT test requested by the chassis controller 22. However, when the number of the requested BIT test is greater than zero (step 10950), then the microcontroller 100 can process the test. The microcontroller then runs a set of instructions corresponding to the requested BIT test number (step 10960) and then returns a BIT test result to the chassis controller 22 (step 10970).

Lastly, the microcontroller 100 sets its internal variable for keeping track of requested BIT test numbers back to zero (step 10980) before completing operation. The microcontroller 100 then waits to execute the next BIT test requested by the chassis controller 22. As indicated above, once in the BIT mode 10930, the microcontroller 100 cannot return to another mode without first being reset. This is a safety feature of the electric vehicle propulsion system 10.

It should be apparent to those skilled in the art that various modifications and variations can be made to the present invention without departing from the spirit or scope of the invention. Thus, it is intended that the present invention cover the modifications and variations of this invention provided they come within the scope of the appended claims and their equivalents.

We claim:

1. A motor controller for a vehicle including an electric motor that drives the vehicle and a vehicle power controller, wherein the vehicle power controller generates mode commands, and wherein the motor controller has a current operating mode, the motor controller comprising:

means for receiving a mode command;

means for transitioning the current operating mode of the motor controller in accordance with the mode command;

means for receiving an operating command while the motor controller is in the current operating mode;

means for determining whether the operating command is an appropriate command for processing during the current operating mode; and means for processing the operating command when the determining means determines that the operating command is an appropriate command.

2. A motor controller in accordance with claim 1 wherein said current operating mode comprises a mode including a neutral mode, a drive mode, a charge mode and a BIT mode.

3. A motor controller for a vehicle including an electric motor that drives the vehicle and a vehicle power controller, wherein the vehicle power controller generates commands, the motor controller comprising:

means for receiving a first command from the vehicle power controller;

means for determining that the first command is one of a plurality of types of commands;

means for identifying a mode in the first command;

means for receiving a second command from the vehicle power controller;

means for processing the second command in accordance with the mode in the first command.

4. A motor controller in accordance with claim 3 wherein said first command comprises a command including a mode command, a current command, a torque command and a BIT command.

5. A motor controller for a vehicle including an electric motor that drives the vehicle, a plurality of sensors and a vehicle power controller, wherein the vehicle power controller receives signals from the plurality of sensors, converts the signals into data, the motor controller comprising:

means for receiving the data from the vehicle power controller; and means for processing the data; and means for outputting a response to the vehicle power controller indicating whether the processing means completed processing the data.

6. A motor controller in accordance with claim 5 wherein said data includes a torque value.

7. A motor controller in accordance with claim 5 wherein said data includes a torque value converted from signals respectively generated by an accelerator sensor and a brake sensor.

8. The motor controller of claim 5 wherein the processing means includes:

means for determining whether the data is valid; and means for stopping processing of the data when the data is not valid.

9. A motor controller in accordance with claim 7 wherein said torque value additionally includes a signal generated by a temperature sensor.

10. A motor controller in accordance with claim 9 wherein said temperature sensor comprises a motor temperature sensor.

11. A computer-implemented method for controlling propulsion in a vehicle including an electric motor that drives the vehicle, a motor controller, and a vehicle power controller, wherein the vehicle power controller generates mode commands, and wherein the motor controller has a current operating mode, the method, implemented by the motor controller, comprising the steps of:

receiving a mode command;

transitioning the current operating mode of the motor controller in accordance with the mode command;

receiving an operating command while the motor controller is in the current operating mode;

determining whether the operating command is an appropriate command for processing during the current operating mode; and processing the operating command when the determining means determines that the operating command is an appropriate command.

12. A computer-implemented method in accordance with claim 11 wherein said current operating mode comprises a mode including a neutral mode, a drive mode, a charge mode, and a BIT mode.

13. A computer-implemented method for controlling propulsion of a vehicle including an electric motor that drives the vehicle, a motor controller and a vehicle power controller, wherein the vehicle power controller generates commands, the method, implemented by the motor controller, comprising the steps of:

receiving a first command from the vehicle power controller;

determining that the first command is one of a plurality of types of commands;

identifying a mode in the first command;

receiving a second command from the vehicle power controller; and processing the second command in accordance with the mode in the first command.

14. A computer-implemented method in accordance with claim 13 wherein said first command comprises a command including a mode command, a current command, a torque command and a BIT command.

15. A computer-implemented method for controlling propulsion of a vehicle including an electric motor that drives the vehicle, a plurality of sensors, a motor controller, and a vehicle power controller, wherein the vehicle power controller receives signals from the plurality of sensors, converts the signals into data, the method, implemented by the motor controller, comprising the steps of:

receiving the data from the vehicle power controller; and processing the data; and outputting a response to the vehicle power controller indicating whether the processing step is completed.

16. A computer-implemented method in accordance with claim 15 wherein said data includes a torque value.

17. A computer-implemented method in accordance with claim 15 wherein said data includes a torque value converted from signals respectively generated by an accelerator sensor and a brake sensor.

18. A computer-implemented method in accordance with claim 17 wherein said torque value additionally includes signals generated by a temperature sensor.

19. A computer-implemented method in accordance with claim 18 wherein said temperature sensor senses a temperature of the motor.

20. The method of claim 15 wherein the processing step includes the substeps of:

determining whether the data is valid; and stopping processing of the data when the data is not valid.

\* \* \* \* \*